(12) United States Patent
Hall

(10) Patent No.: US 9,319,842 B2
(45) Date of Patent: Apr. 19, 2016

(54) MOBILE DEVICE CONFIGURED POINT AND SHOOT TYPE WEAPON

(75) Inventor: Robert Hall, Berkeley Heig, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 745 days.

(21) Appl. No.: 13/169,829

(22) Filed: Jun. 27, 2011

(65) Prior Publication Data

US 2012/0329538 A1    Dec. 27, 2012

(51) Int. Cl.

| | |
|---|---|
| A63F 9/24 | (2006.01) |
| A63F 13/00 | (2014.01) |
| G06F 17/00 | (2006.01) |
| G06F 19/00 | (2011.01) |
| H04W 4/02 | (2009.01) |
| A63F 13/30 | (2014.01) |
| H04W 4/18 | (2009.01) |
| A63F 13/216 | (2014.01) |
| A63F 13/20 | (2014.01) |
| A63F 13/31 | (2014.01) |

(52) U.S. Cl.
CPC ............ *H04W 4/026* (2013.01); *A63F 13/12* (2013.01); *H04W 4/185* (2013.01); *A63F 13/20* (2014.09); *A63F 13/216* (2014.09); *A63F 13/31* (2014.09); *A63F 2300/406* (2013.01); *A63F 2300/513* (2013.01); *A63F 2300/5573* (2013.01); *A63F 2300/64* (2013.01); *A63F 2300/8076* (2013.01)

(58) Field of Classification Search
CPC ........ A63F 13/216; A63F 13/20; A63F 13/31
USPC .......................................................... 463/2
See application file for complete search history.

(56) References Cited

U.S. PATENT DOCUMENTS

| | | |
|---|---|---|
| 5,483,667 A | 1/1996 | Faruque |
| 6,015,344 A | 1/2000 | Kelly et al. |
| 6,069,885 A | 5/2000 | Fong et al. |
| 6,119,976 A | 9/2000 | Rogers |
| 6,195,751 B1 | 2/2001 | Caronni et al. |
| 6,304,556 B1 | 10/2001 | Haas |
| 6,428,470 B1 * | 8/2002 | Thompson ................... 600/173 |
| 6,628,620 B1 | 9/2003 | Cain |

(Continued)

FOREIGN PATENT DOCUMENTS

WO    WO 2007/016641 A2    2/2007

OTHER PUBLICATIONS

Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.

(Continued)

*Primary Examiner* — Milap Shah
*Assistant Examiner* — Jason Pinheiro
(74) *Attorney, Agent, or Firm* — Baker & Hostetler LLP

(57) ABSTRACT

A mobile device is configured as a point and shoot type weapon for gaming, training, or the like. Utilizing the mobile device based weapon, such as a smart phone for example, a user thereof can simply aim the mobile device at a target and shoot. Shooting may be accomplished by tapping the mobile device, activating a button or soft key on the mobile device, making a gesture (e.g., moving a finger as if a trigger is being pulled), providing an audible command (e.g., "shoot"), or the like.

20 Claims, 22 Drawing Sheets

(56) References Cited

U.S. PATENT DOCUMENTS

| | | |
|---|---|---|
| 6,781,971 B1 | 8/2004 | Davis et al. |
| 6,807,165 B2 | 10/2004 | Belcea |
| 6,816,460 B1 | 11/2004 | Ahmed et al. |
| 6,870,846 B2 | 3/2005 | Cain |
| 6,873,613 B1 | 3/2005 | Dent |
| 6,879,574 B2 | 4/2005 | Naghian et al. |
| 6,909,706 B2 | 6/2005 | Wilmer et al. |
| 6,937,602 B2 | 8/2005 | Whitehill et al. |
| 6,940,832 B2 | 9/2005 | Saadawi et al. |
| 6,954,435 B2 | 10/2005 | Billhartz et al. |
| 6,958,986 B2 | 10/2005 | Cain |
| 7,027,822 B1 | 4/2006 | Hwang et al. |
| 7,152,110 B2 | 12/2006 | Pierce |
| 7,179,166 B1 | 2/2007 | Abbott |
| 7,197,326 B2 | 3/2007 | Acampora |
| 7,295,521 B2 | 11/2007 | Choi et al. |
| 7,307,978 B2 | 12/2007 | Carlson |
| 7,525,933 B1 | 4/2009 | Hall |
| 7,540,028 B2 | 5/2009 | Ahmed et al. |
| 7,613,467 B2 | 11/2009 | Fleischman |
| 7,669,052 B2 | 2/2010 | Asano et al. |
| 7,813,326 B1 | 10/2010 | Kelm et al. |
| 7,864,168 B2 | 1/2011 | French |
| 7,917,169 B1 | 3/2011 | Hall |
| 7,969,914 B1 | 6/2011 | Gerber |
| 7,970,749 B2 | 6/2011 | Uhlir et al. |
| 8,073,327 B2 | 12/2011 | Mayer |
| 8,085,813 B2 | 12/2011 | Melick et al. |
| 8,128,405 B2 | 3/2012 | Preston et al. |
| 8,149,801 B2 | 4/2012 | Hall |
| 8,248,367 B1 | 8/2012 | Barney et al. |
| 8,332,544 B1 | 12/2012 | Ralls et al. |
| 8,341,271 B2 | 12/2012 | Cho et al. |
| 8,359,643 B2 | 1/2013 | Low et al. |
| 8,376,857 B1 | 2/2013 | Shuman et al. |
| 8,483,652 B2 | 7/2013 | Hall |
| 8,599,848 B2 | 12/2013 | Janneteau |
| 2001/0014094 A1 | 8/2001 | Epley |
| 2002/0113872 A1* | 8/2002 | Kinjo .......................... 348/116 |
| 2002/0141454 A1 | 10/2002 | Muniere |
| 2002/0155846 A1 | 10/2002 | Shiraga |
| 2002/0163912 A1 | 11/2002 | Carlson |
| 2002/0167960 A1 | 11/2002 | Garcia-Luna-Aceves |
| 2002/0169971 A1 | 11/2002 | Asano et al. |
| 2003/0074413 A1 | 4/2003 | Nielsen et al. |
| 2003/0105956 A1 | 6/2003 | Ishiguro et al. |
| 2003/0174690 A1 | 9/2003 | Benveniste |
| 2003/0193394 A1 | 10/2003 | Lamb |
| 2003/0235158 A1 | 12/2003 | Lee |
| 2004/0013062 A1 | 1/2004 | Hino et al. |
| 2004/0032847 A1 | 2/2004 | Cain |
| 2004/0083385 A1 | 4/2004 | Ahmed et al. |
| 2004/0121792 A1 | 6/2004 | Allen et al. |
| 2004/0151144 A1 | 8/2004 | Benveniste |
| 2004/0185881 A1 | 9/2004 | Lee et al. |
| 2004/0213270 A1 | 10/2004 | Su et al. |
| 2004/0259563 A1 | 12/2004 | Morton et al. |
| 2005/0036448 A1 | 2/2005 | Leeuwen |
| 2005/0058151 A1 | 3/2005 | Yeh |
| 2005/0086350 A1 | 4/2005 | Mai |
| 2005/0096065 A1 | 5/2005 | Fleischman |
| 2005/0129051 A1 | 6/2005 | Zhu et al. |
| 2005/0152318 A1 | 7/2005 | Elbatt et al. |
| 2005/0152378 A1 | 7/2005 | Bango et al. |
| 2005/0243788 A1 | 11/2005 | Janczak |
| 2005/0254453 A1 | 11/2005 | Barneah |
| 2005/0259597 A1 | 11/2005 | Benedetto |
| 2005/0271057 A1 | 12/2005 | Kim et al. |
| 2006/0013154 A1 | 1/2006 | Choi et al. |
| 2006/0023677 A1 | 2/2006 | Labrador |
| 2006/0084444 A1 | 4/2006 | Kossi et al. |
| 2006/0126535 A1 | 6/2006 | Sherman |
| 2006/0128349 A1 | 6/2006 | Yoon |
| 2006/0148516 A1 | 7/2006 | Reddy et al. |
| 2006/0153157 A1 | 7/2006 | Roh et al. |
| 2006/0227787 A1 | 10/2006 | Furlong et al. |
| 2007/0008925 A1 | 1/2007 | Dravida et al. |
| 2007/0019591 A1 | 1/2007 | Chou et al. |
| 2007/0019594 A1 | 1/2007 | Perumal et al. |
| 2007/0104096 A1 | 5/2007 | Ribera |
| 2007/0110092 A1 | 5/2007 | Kangude et al. |
| 2007/0180533 A1 | 8/2007 | Ramaiah et al. |
| 2007/0198731 A1 | 8/2007 | Li et al. |
| 2007/0217346 A1 | 9/2007 | Zheng |
| 2007/0259716 A1 | 11/2007 | Mattice et al. |
| 2007/0259717 A1 | 11/2007 | Mattice et al. |
| 2007/0263571 A1 | 11/2007 | Hermann et al. |
| 2007/0265088 A1 | 11/2007 | Nakada et al. |
| 2007/0265089 A1 | 11/2007 | Robarts et al. |
| 2007/0266396 A1 | 11/2007 | Estermann |
| 2007/0283001 A1 | 12/2007 | Spiess et al. |
| 2007/0287437 A1 | 12/2007 | Cartmell |
| 2008/0015024 A1 | 1/2008 | Mullen |
| 2008/0039113 A1 | 2/2008 | Liu et al. |
| 2008/0058099 A1 | 3/2008 | Schwartz et al. |
| 2008/0080401 A1 | 4/2008 | Ribiere |
| 2008/0144493 A1 | 6/2008 | Yeh |
| 2008/0147854 A1 | 6/2008 | Van Datta et al. |
| 2008/0159236 A1 | 7/2008 | Ch'ng |
| 2008/0163355 A1 | 7/2008 | Chu |
| 2008/0186206 A1 | 8/2008 | Reumerman |
| 2008/0192737 A1 | 8/2008 | Miyazaki |
| 2008/0262928 A1 | 10/2008 | Michaelis |
| 2009/0005140 A1 | 1/2009 | Rose et al. |
| 2009/0017913 A1 | 1/2009 | Bell et al. |
| 2009/0030605 A1 | 1/2009 | Breed |
| 2009/0041039 A1 | 2/2009 | Bear |
| 2009/0045977 A1 | 2/2009 | Bai et al. |
| 2009/0046628 A1 | 2/2009 | Hall |
| 2009/0073912 A1 | 3/2009 | Bauchot et al. |
| 2009/0122753 A1 | 5/2009 | Hughes et al. |
| 2009/0138353 A1 | 5/2009 | Mendelson |
| 2009/0175223 A1 | 7/2009 | Hall |
| 2009/0201860 A1 | 8/2009 | Sherman et al. |
| 2009/0207783 A1 | 8/2009 | Choi et al. |
| 2009/0245518 A1 | 10/2009 | Bae et al. |
| 2009/0248420 A1 | 10/2009 | Basir |
| 2009/0292926 A1 | 11/2009 | Daskalopoulos et al. |
| 2009/0298461 A1 | 12/2009 | O'Reilly |
| 2009/0323579 A1 | 12/2009 | Bai et al. |
| 2009/0325603 A1 | 12/2009 | Van Os et al. |
| 2010/0008259 A1 | 1/2010 | Yoon et al. |
| 2010/0029245 A1 | 2/2010 | Wood et al. |
| 2010/0042601 A1 | 2/2010 | Kelley et al. |
| 2010/0060480 A1 | 3/2010 | Bai et al. |
| 2010/0064307 A1 | 3/2010 | Malhotra et al. |
| 2010/0067451 A1 | 3/2010 | Hall |
| 2010/0069109 A1 | 3/2010 | Hall |
| 2010/0074234 A1 | 3/2010 | Banks et al. |
| 2010/0082513 A1 | 4/2010 | Liu |
| 2010/0128653 A1 | 5/2010 | Tateson |
| 2010/0150129 A1 | 6/2010 | Jin et al. |
| 2010/0162149 A1 | 6/2010 | Sheleheda et al. |
| 2010/0169009 A1 | 7/2010 | Breed et al. |
| 2010/0214987 A1 | 8/2010 | Mori |
| 2010/0215040 A1 | 8/2010 | Kappler et al. |
| 2010/0226342 A1 | 9/2010 | Colling et al. |
| 2010/0235633 A1 | 9/2010 | Asano et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0279776 A1 | 11/2010 | Hall |
| 2010/0287011 A1 | 11/2010 | Muchkaev |
| 2010/0304759 A1 | 12/2010 | Leppanen et al. |
| 2010/0329463 A1 | 12/2010 | Ratliff et al. |
| 2011/0002243 A1 | 1/2011 | Sherman et al. |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |
| 2011/0177829 A1 | 7/2011 | Platt et al. |
| 2011/0201369 A1 | 8/2011 | Kim et al. |

(56) References Cited

U.S. PATENT DOCUMENTS

| | | |
|---|---|---|
| 2011/0230202 A1 | 9/2011 | Wood et al. |
| 2011/0244887 A1 | 10/2011 | Dupray et al. |
| 2011/0299685 A1 | 12/2011 | Hall |
| 2012/0058814 A1 | 3/2012 | Lutnick et al. |
| 2012/0079080 A1 | 3/2012 | Pishevar |
| 2012/0084364 A1 | 4/2012 | Sivavakeesar |
| 2012/0094770 A1 | 4/2012 | Hall |
| 2012/0108326 A1 | 5/2012 | Hall |
| 2012/0128010 A1 | 5/2012 | Huang et al. |
| 2012/0157210 A1 | 6/2012 | Hall |
| 2012/0329538 A1 | 12/2012 | Hall |
| 2014/0082369 A1 | 3/2014 | Waclawsky et al. |
| 2014/0100027 A1 | 4/2014 | Harris et al. |

OTHER PUBLICATIONS

U.S. Appl. No. 13/277,895, filed Oct. 20, 2011, Hall.
U.S. Appl. No. 13/327,472, filed Dec. 15, 2011, Hall.
U.S. Appl. No. 13/333,084, filed Dec. 21, 2011, Hall.
U.S. Appl. No. 13/683,025, filed Nov. 21, 2012, Panta.
U.S. Appl. No. 13/712,353, filed Dec. 12, 2012, Hall.
U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.
Ko et al., "Geocasting in Mobile Ad Hoc Networks: Location-based Multicast Algorithms", Technical Report TR-98-018 Texas A&M University, Sep. 1998.
Ko, et al., "Flooding-Based Geocasting Protocols for Mobile Ad Hoc Networks," Mobile Networks and Applications, Dec. 2002, 7, 471-480.
Hall et al., "A Two-Level Quality of Service Scheme for Collision based on Mobile Ad Hoc Networks", IEEE, 1-4244-1513-06/07, 2007, 8 pages.
Hall, "RTEQ: Modeling and Validating Infinite-State Hard-Real-Time Systems", AT&T Labs Research, ASE 2007, Nov. 2007, 4 pages.
Hall, "Cheating Attacks and Resistance Techniques in Geogame Design," Proc. 2010 ACM FuturePlay Symposium, 2010, 82-89.
Hall, "An Improved Geocast for Mobile Ad Hoc Networking," IEEE Transactions on Mobile Computing, 2010, 1-14.
Illyas, "Body Personal, and Local Ad Hoc Wireless Networks", Chapter 1, CRC Press, 2003, 22 pages.
Liao et al., "GRID: A Fully Location-Aware Routing Protocol for Mobile Ad Hoc Networks", Telecommunication Systems, 2001, 18, pp. 1-26.
Shih et al., A Distributed Slots Reservation Protocol for QoS Routing on TDMA-based Mobile Ad Hoc Networks, 2004, (ICON 2004), Proceedings, 12th IEEE International Conference, Nov. 2004, 2, 660-664.
Shih et al., "CAPC: A Collision Avoidance Power Control MAC Protocol for Wireless Ad Hoc Networks", IEEE Communications Letters, Sep. 2005, 9(9), 859-861.
Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.
Corbett, et al. "A Partitioned Power and Location Aware MAC Protocol for Mobile Ad Hoc Networks," Technical Report No. 553, University of Sydney, School of Information Technologies, Jul. 2004, 7 pages.
Panta, "GeoV2V: Vehicular Communications Using a Scalable Ad Hoc Geocast Protocol," AT&T Labs Research, 14 pages.
Balasubramaniam, et al. "Interactive WiFi Connectivity for Moving Vehicles," Proceedings of SIGCOMM, Aug. 17-22, 2008, 12 pages.
Maihofer, "A Survey of Geocast Routing Protocols," IEEE Communications Surveys, Jun. 2004, 32-42.
Das, et al., "SPAWN: A Swarming Protocol for Vehicular Ad-Hoc Wireless Networks," Proceedings of 1st ACM Vanet, Oct. 2004, 2 pages.
German Aerospace Center, Simulation of Urban Mobility, 2010, http://sumo.sourceforge.net, 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Heissenbüttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: Of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem in a Mobile Ad Hoc Network," Proceedings of the 5th Annual ACM/IEEE International Conference on Mobile Computing and Networking, ACM, 1999, 151-162.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009.
Niculescu, et al., "Trajectory Based Forwarding and Its Applications," Proc. Mobicom 2003, ACM, 2003, 13 pages.
Ns-2, "The Network Simulator," 2010, http://isi.edu/nsnam/ns, 2 pages.
Schwingenschlogl, "Geocast Enhancements of AODV for Vehicular Networks," ACM SIGMOBILE Mobile Computing and Communications Review, Jun. 2002, 18 pages.
Shevade, et al., "Enabling High-Bandwidth Vehicular Content Distribution," Proceedings of CoNEXT 2010, Nov. 30-Dec. 3, 2010, 12 pages.
Yassein, et al., "Performance Analysis of Adjusted Probabilistic Broadcasting in Mobile Ad Hoc Networks," Proc. 11th Intl. Conf. on Parallel and Distributed Systems Workshops, 2005, 27 pages.
Zahn, et al., "Feasibility of Content Dissemination Between Devices in Moving Vehicles," Proceedings of CoNEXT 2009, Dec. 1-4, 2009, 11 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.
Social + Gaming—SWiK: http://swik.net/social+ gaming.
http://askville.amazon.com/Wii-games-play-Internet-Family/AnswerViewer.do?requestId=6796582(2007).
Schutzberg, "Phone-based GPS-based Games: Missing Pieces"; http://www.directionsmag.com/articlephp?article_id=939 (Aug. 17, 2005).
"Boost Mobile Introduces First Location-based, GPS games in US" http://www.physorg.com/news5824.html (Aug. 16, 2005).
"Sony bigwig hints at GPS-enabled PSP games"; http:www.vespacious.com/sony-bigwig-hints-at-gps-enabled-psp-games.html (Dec. 22, 2008).
Steve:"GPS-enabled Cell Phone Games" http://www.strangenewproducts.com/2005/08/gps-enabled-cell-phone-games.html (Aug. 15, 2005).
Location-Enabled Mobile Gaming; http://www.nn4d.com/site/global/market/affiliate_sites/lbsglobe/lbsapplications/mobilegaming.jsp (2007).

(56) References Cited

OTHER PUBLICATIONS

Panta, "GeoV2V: Vehicular Communications Using a Scalable Ad Hoc Geocast Protocol," AT&T Labs Research, Nov. 2011, 14 pages.
Social + Gaming—SWiK: http://swik.net/social+ gaming, 2009.
U.S. Appl. No. 13/875,735, filed May 2, 2013, Hall.
U.S. Appl. No. 13/890,423, filed May 9, 2013, Hall.
Nicklas et al., "On building location aware applications using an open platform based on the NEXUS Augmented World Model," Software and Systems Modeling, Dec. 2004, 3(4), 303-313.
Nintendo, The computer game "Mario Kart OS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.
Winkler, Additional date evidence for the Ars Electronica organization archive document http://archive.aec.at/submission/2004/U19/1043/, retrieved from http://web.archive.org/web/20050508084628/http://www.aec.at/en/archives/prix_archive/prixproject.asp?iProjectID=12899, 2005, 1 page.
Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.
Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
bzflag(6):tank battle game—linux man page, Google date Feb. 1, 2001, downloaded from http://linux.die.net/man/6/bzflag.
de Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14 pages, downloaded from http://www.dialogic.com/-/media/products/docs/signaling-and-ss7-components/9862_Add_Locationbased_Servs_an.pdf.
Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.
Halas, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.asp?ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.
Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based multi-user gaming", Proceedings of Computer Games and Digital Cultures Conference, Tampere University Press, 2002, pp. 35-44.
U.S. Appl. No. 14/279,441, filed May 16, 2014, Hall.

\* cited by examiner

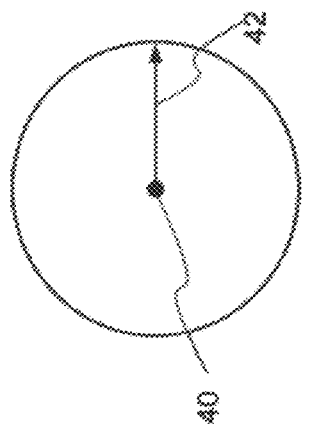
Figure 5A
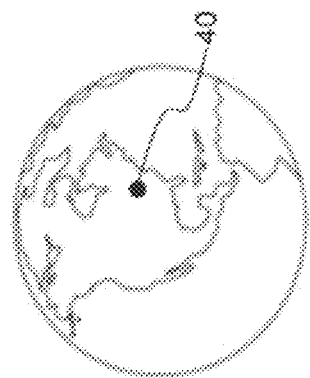
Figure 5B
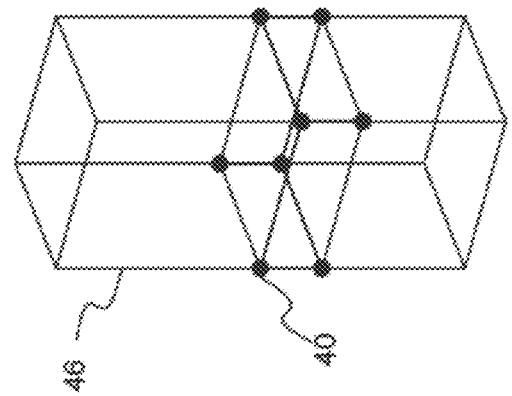
Figure 5C
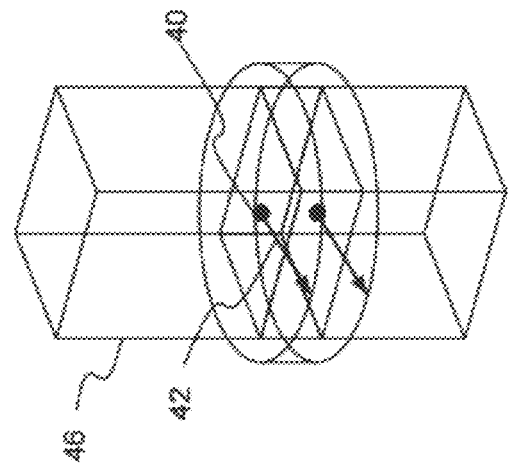
Figure 5D
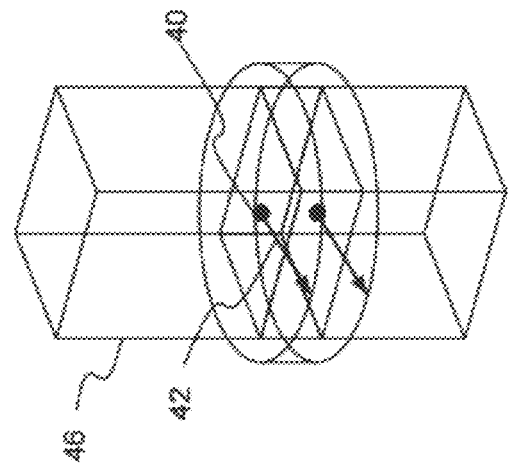
Figure 5E
FIGURE 5

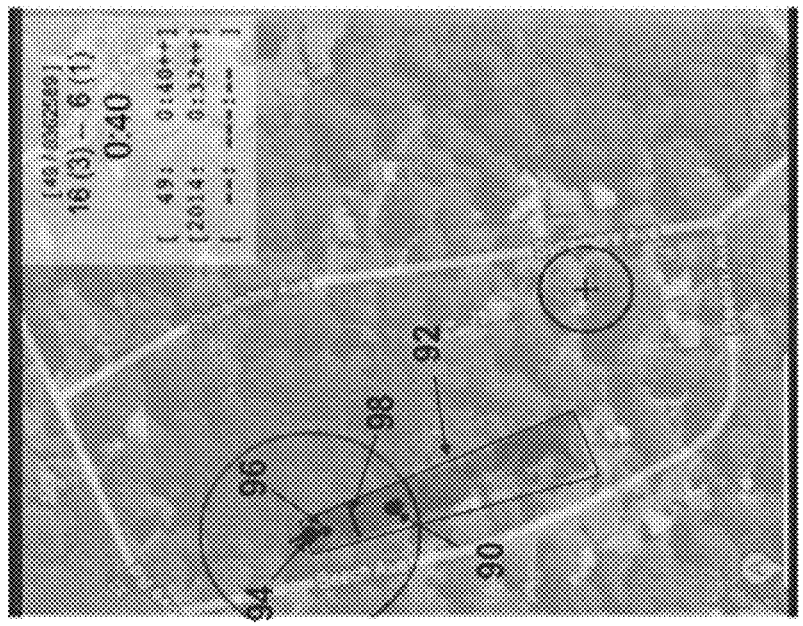
FIGURE 9B
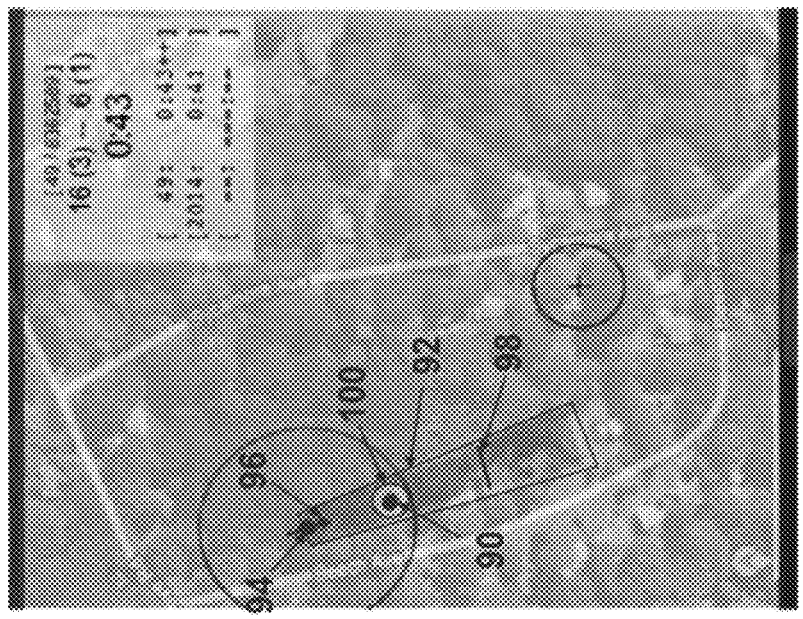
FIGURE 9A
FIGURE 9

```
Procedure Adjudication Function, Aq (Q : [0, 1))
::Returns a table T mapping integer depths into nonnegative widths that implements Aq
Initialize data structure, buckets, which maps integer depths into sorted lists of width samples,
    with each entry initially empty
Define a 1-meter grid covering effect area in the (x, y)-plane
Do R times:
    For each grid point p in the effect area
        Using the position sensor error model,
            draw random position errors S and P
        Using the point angle sensor error model,
            draw a random aim error A
        Compute d = depth(S, p + P, A)
        Compute w = width(S, p + P, A)
        Sorted-insert sample w to buckets [Int(d)]
Initialize lookup table T with all entries −1
For each depth D having samples
    Find the minimum width W which is ≥ q% of the values of the entries in buckets[D]
    Set T[D] := W
Return T
```

FIGURE 10

MOBILE DEVICE CONFIGURED POINT AND SHOOT TYPE WEAPON

TECHNICAL FIELD

The technical field generally relates to a point and shoot type weapons for multi-player games and training utilizing mobile devices such as smart phones.

BACKGROUND

Video games are extremely popular. As a result of advances in technology, physical activity of a player can be incorporated into a video game (e.g., Nintendo's® Wii™). Players of video games involving physical activity and/or movement are typically limited to playing the games within restricted environments. For example, players of many gaming systems interact with the gaming system via wired and/or wireless controllers. The controllers have a limited range, thus, limiting physical video games to indoor use within a limited range from a gaming console and/or home entertainment system. Even wireless controllers limit game play to a small portion of a room by ultra short-range signals used to allow a player to see the video monitor. Often game consoles must be positioned on a stable, flat surface, and require 110 volt connections to a power supply. These characteristics leave gaming consoles with little to no portability.

Multiplayer versions of video games involving physical movement typically allow multiple players to compete against one another. Players may be located within one physical area, with simultaneous access to one gaming console, or may be located at various physical areas and link up over a network such as the Internet. Despite the physical distance separating them, players engaged in a multiplayer game from different physical locations still have the above described limited movement restriction imposed upon them. Further, these games typically rely on the constant presence of wireless and/or wireline network connectivity. If access to the network is interrupted, for even very short periods of time, the multiplayer gaming experience can be deteriorated or lost altogether. Thus, it is sometimes not possible to enjoy multiplayer gaming involving physical movement at all, for example in a remote geographic area with limited or no network service available.

SUMMARY

A mobile device is configured as a point and shoot type weapon for gaming, training, or the like. Utilizing the mobile device (such as a smart phone for example) based weapon, a user thereof can simply aim the mobile device at a target and shoot. In an example embodiment, the target also includes a mobile device, such as a game player carrying a mobile device, for example. Shooting may be accomplished by tapping the mobile device, activating a button or soft key on the mobile device, making a gesture (e.g., moving a finger as if a trigger is being pulled), providing an audible command (e.g., "shoot"), or the like. Thus, players of a game, for example, can implement physical real-time tactics involving dexterity and speed to play the game.

In an example embodiment, data acquired via sensors (e.g., position sensors, GPS-based position sensors, point-angle sensors, accelerometers, etc.) on mobile devices are used to determine a target hit zone, target hit trajectory, and/or whether a target has been hit. In an example configuration, a shooting device comprises a position sensor and a point-angle sensor, and a target device comprises a position sensor. Data streams acquired from sensors are utilized to compute analytic geometric measures that are then used in conjunction with pre-computed values to determine if a target has been hit. In an example embodiment, pre-computed values are determined based upon Monte Carlo simulations incorporating statistical error models of the sensors. Contours within the geometric measure space are calculated to determine weapon effect areas.

Additionally, a scalable wireless geographic broadcast ("geocast") protocol is utilized for inter-device communications to support the messaging needed to implement a shot transaction. The geocast protocol does not depend upon a network infrastructure, such as 3G, 4G, LTE, a WiFi hotspot, or the like. Rather, the geocast protocol uses the radio communications capability of the mobile devices.

BRIEF DESCRIPTION OF THE DRAWINGS

FIG. 1(a) depicts an effect area for a beam type weapon. FIG. 1(b) depicts another example effect area for a projectile type weapon or a narrow beam type weapon. FIG. 1(c) depicts an effect area for a grenade type weapon.

FIG. 5, comprising FIG. 5A, FIG. 5B, FIG. 5C, FIG. 5D, and FIG. 5E depict example geocast regions or boundaries.

FIG. 9 comprises FIG. 9A and FIG. 9B, and is an illustration of example displays that can be rendered on a PSW. FIG. 9A illustrates a rendered display on a target device before a round has hit. FIG. 9B illustrates a rendered display on a target device after the round has hit the target.

FIG. 10 depicts example pseudo code for generating a look up table of width values.

DETAILED DESCRIPTION OF ILLUSTRATIVE EMBODIMENTS

Figure 1:
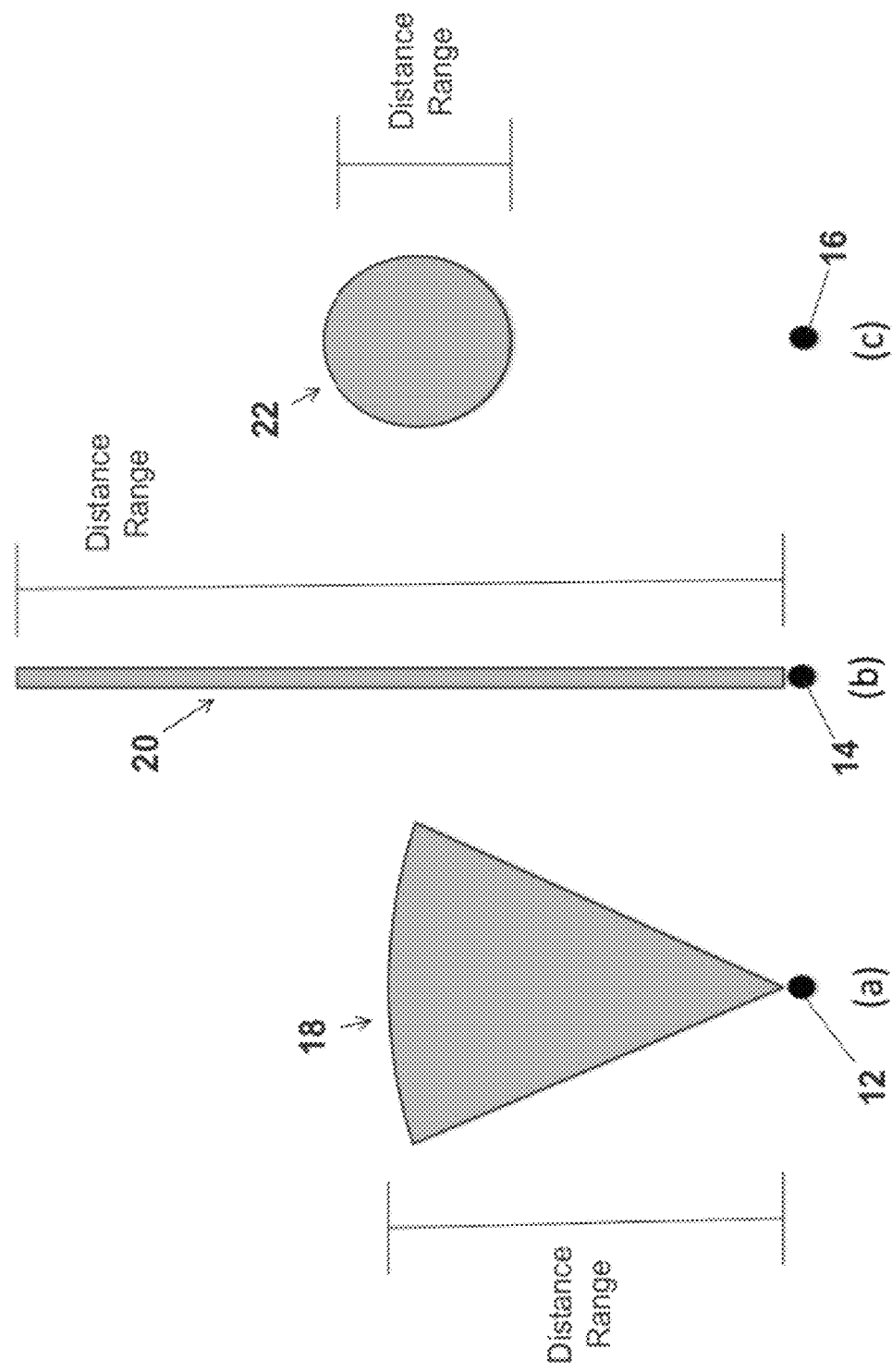
FIG. 1 illustrates example effect areas for various types of weapons.

As described herein, mobile devices are configured as point and shoot type weapons that can be utilized for games, training, or the like, and the mobile devices communicate with each other via a geocast protocol. For the sake of convenience, a mobile device configured as a point and shoot type weapon also is referred to herein as a PSW and multiple such devices are referred to as PSWs. Although the application of PSWs primarily is described herein in the context of games, it is to be understood that applications are not limited thereto. For example, PSWs can be used by the military and/or law enforcement, or the like for training, situation simulations, ranking of personnel skills, promotion requirements, etc.

Various embodiments of PSWs are described herein. The described embodiments are merely examples that may be embodied in various and alternative forms, and combinations thereof. As used herein, for example, "exemplary," and similar terms, refer expansively to embodiments that serve as an illustration, specimen, model, or pattern. The figures are not necessarily to scale and some features may be exaggerated or minimized, such as to show details of particular components. In some instances, known components, systems, materials, or methods have not been described in detail in order to avoid obscuring the instant disclosure. Therefore, specific structural and functional details disclosed herein are not to be interpreted as limiting, but rather as a basis for the claims and as a representative basis for teaching one skilled in the art how to employ the teachings instant application in various ways.

Multi-player games utilizing mobile devices can be used to play games outdoors and can improve players' health by requiring vigorous physical activity in an interesting and challenging natural environment, while still providing engaging virtual elements and enabling social interaction. However, if such games are too screen-oriented (e.g., require constant attention to a display on a mobile device), a player's skill and safety in running, jumping, climbing, etc. could be degraded because the player is staring at the display of the mobile device. Thus, the herein described PSWs are configured to reduce and/or minimize screen reading. Accordingly, in an example embodiment, PSWs are configured to allow a player simply to point the mobile device to aim and tap the mobile device to shoot. As described herein, in various embodiments, to shoot a PSW, a player could tap the mobile device, touch a button/soft key on the mobile device, make a gesture (e.g., moving a finger as if a trigger is being pulled), and/or provide an audible command (e.g., "shoot", "fire", etc.) to the mobile device. In various example embodiments, a mobile device can include any appropriate device that includes at least a location sensor and/or a compass (pointing angle) sensor.

Traditional physical activities (e.g., sports games, hide and seek, tag, etc.) can develop the growth of motor and spatial reasoning skills. Combining mobile devices with physical activities can enhance development of these skills by engaging virtual elements familiar from electronic games. Social interaction skills can also be enhanced. Further, by adding video game elements implemented on mobile devices (e.g., smartphones, wearable devices, etc.) a participant can enjoy complex and interesting mental experiences by interacting with virtual objects, terrain, and creatures that exist in the virtual realm.

In an action game where players commonly run, jump, and climb, PSWs perform as "action weapons" that a player can aim and shoot without requiring the player to aim at a target via visual feedback from a display of the PSW. This is advantageous because visually observing the display can both slow a player down, and can endanger safety in the same way that drivers of cars who use text messaging drastically increase the risk of crashing.

In an example embodiment, a PSW is aimed by pointing an appropriate portion of the PSW, such as the top of the mobile device, in the direction that the "shot" is intended to travel. Thus, a user of the device can point the PSW in a desired direction, provide an indication that the device is being fired without the need to visually observe a display of the PSW. This could encompass pointing the PSW directly at a target (e.g., simulating shooting a handgun), pointing the PSW at a region close to the target (e.g., simulating throwing a grenade), pointing the PSW to shoot a projectile over an obstacle (e.g., a wall), or the like. The PSW senses this input by determining the value(s) of the PSW's on-board direction sensor at a particular time, which is referred to herein as the trigger pull time. In an example embodiment, the direction sensor can be accessed via an application program interface (API) to obtain real-time updates pertaining to the angle, of the top of the device for example, relative to a specific direction, such as true North for example. The user activating the PSW is referred to herein as the shooter and any other entity/player/user that may (or may not) be affected by the round is referred to herein as a target. The time at which a target is affected or hit by the shot is referred to herein as the round effect time. Thus, if a target is deemed "hit" or affected by the weapon, it is at round effect time, which need not be the same as trigger pull time.

In various example embodiments, a PSW can perform as an area effect weapon and/or a projectile weapon. As used herein, an area effect weapon has a defined target area defined relative to the position of the shooter at trigger pull time. Every target within the target region at round effect time is deemed hit, and depending upon the rules of a particular game, may take on some form of damage. Examples of PSW area effect weapons include shotguns, Star Trek phasers set to wide beam or narrow beam, and high-rate machine guns. To implement area effect weapon shots, one or more shot message(s) is/are delivered to devices in or near the effect area.

FIG. 1 illustrates example effect areas for various types of weapons. FIG. 1(*a*) depicts an effect area for a beam type weapon. The black dot 12 at the bottom of FIG. 1(*a*) represents the true shooter position. The gray area 18 depicts an example effect area for a beam type weapon with respect to the true shooter position. An object within the effect area 18 at round effect time will have been determined to have been hit by a shot from the beam type weapon. The effect area 18 can comprise any appropriate shape. For example, as depicted in FIG. 1(a), the effect area 18 is that of a conical plane wherein the width increases as distance range from the true shooter position 12 increases. The maximum distance range can comprise any appropriate value, for example, the maximum distance range of the effect area 18 may be 75 meters from the true shooter position.

FIG. 1(b) depicts another example effect area for a projectile type weapon or a narrow beam type weapon. The black dot 14 at the bottom of FIG. 1(b) represents the true shooter position. The gray area 20 depicts an example effect area for a projectile or narrow beam type weapon with respect to the true shooter position. An object within the effect area 20 at round effect time will have been determined to have been hit by a shot from narrow beam type weapon. A shot from a projectile type weapon however is subject to arbitration. In an example embodiment, a projectile weapon sends a modeled object, e.g., a bullet, along a path. A target at a point on the path when the projectile reaches that point is determined to have been hit by the projectile. Example projectile weapons include rifles and handguns. In addition to an initial shot message, projectile weapons utilize arbitration messages, sent by candidate targets. An arbiter routine operating on one or more of the devices collects information from arbitration messages about which devices may have been hit and then decides which device or devices actually were hit, distributing the decision to effected devices via another arbitration message(s). Thus, a projectile type weapon has a respective effect area, as depicted in FIG. 1(b), and will be subject to arbitration. The effect area 20 can comprise any appropriate shape. For example, as depicted in FIG. 1(b), the effect area 20 is that of an elongated rectangle wherein the width remains constant as distance range from the true shooter position 14 increases. The maximum distance range can comprise any appropriate value, for example, the maximum distance range of the effect area 20 may be 200 meters from the true shooter position.

FIG. 1(c) depicts an effect area for a grenade type weapon. The black dot labeled 16 at the bottom of FIG. 1(c) represents the true shooter position. The gray area 22 depicts an example effect area for grenade type weapon with respect to the true shooter position. In an example embodiment, an object within the effect area 22 at round effect time will have been determined to have been hit by a shot from the grenade type weapon. In another example embodiment, an object within the effect area 22 may be protected by shadowing, as described below. The effect area 22 can comprise any appropriate shape. For example, as depicted in FIG. 1(c), the effect area 22 is circular. However, the effect area 22 could be an oval, or other appropriate shape. The distance range can comprise any appropriate values, for example, the distance range of the effect area 22 may be 65 meters at its closest to the true shooter position 16 and 85 meters at its furthest from the true shooter position 16.

Shadowing refers to a possible target evading being hit by being positioned behind another object, entity, or element with respect to the path of the weapon effect. In an example embodiment, projectile type weapons incorporate shadowing by having only the first target reached take the hit. Shadowing also can be modeled in area effect weapons. Consider a "grenade" which affects a circular area on exploding, but which allows one person to hide safely on the opposite side of another target from the center point. Shadowing can be target-by-target or target-by-terrain. In the latter, the game system can model terrain features, such as hills, buildings, and rocks, in order to calculate shadowing relationships. In an example embodiment, the terrain models can include detailed 3-D terrain models for play venues. The 3-D terrain models could be obtained, for example, via satellite images.

In various example embodiments, a PSW can implement various models of round motion. A model, referred to as fast rounds, assumes that rounds travel effectively instantaneously; that is, round effect time is the same as trigger pull time, or as close to it as communications and processing delays allow. Most guns and beam weapons from real life are modeled as having fast rounds. Another example model, referred as slow rounds, allows some time between trigger pull time and round effect time. Slow rounds may be advantageous in outdoor multiplayer games that are intended to promote physical exertion. For example, a player can be encouraged to sprint by implementing a round to allow the possibility of escape when the target reacts fast enough to a warning and runs away. Examples of slow-round PSW that might be simulated in a game include cruise missiles, grenades, and Romulan plasma bolts, or the like.

As previously described, in an example configuration, a shooter PSW comprises at least one position sensor and at least one point-angle (compass) sensor, and a target device comprises at least one position sensor. Because position sensors and compass sensors may be inaccurate, in various example configurations, sensor values are modeled.

In various example configurations of PSWs, position sensor accuracies and performance can be modeled. In an example embodiment, the (x, y)-position returned from a position sensor of a PSW is modeled by two random Cartesian coordinate variables that vary according to independent Gaussian normal distributions. For example, if the true position of a device is (x, y), the sensed position of the device is modeled as (x+X, y+Y), where X and Y can be generated using normal pseudorandom numbers. Each of X and Y can be drawn from a normal distribution having mean 0 and standard deviation 1, and scaled by multiplication by a device error parameter. The device error parameter can have any appropriate value. In an example embodiment, the device error parameter has a value of 9 meters.

In various example configurations of PSWs, compass accuracies and performance can be modeled. In an example embodiment, the magnetic compass sensor is modeled utilizing a single random factor (fuzz factor) drawn from a normal distribution. In an example embodiment, the North-angle reported by the sensor when the device's true North-angle is α radians is (α+ω) radians, where ω is a pseudorandom value drawn from a normal distribution with mean 0 and standard deviation 1, scaled by a device parameter. The device parameter can have any appropriate value. In an example embodiment, the device parameter has a value of 5 degrees (0.0873 radians).

PSWs utilize moving information between the shooter devices and target devices, in order for the hit determination to be made, as well as to award damage or points. Further, games can be played outdoors in areas that are not necessarily well served by wireless wide area network coverage, such as parks, beaches, and camps. Also, players can be encouraged to roam freely without concern for unattended equipment, such as game consoles or laptops, that must be left lying around and protected from the elements. Consequently, it is advantages to implement PSWs on mobile devices such as smartphones or the like, that players can easily carry.

Accordingly, in an example embodiment, a scalable ad hoc geographic broadcast (geocast) protocol is utilized to facilitate communications between PSWs. Geocast is a network primitive supporting geographic addressing of messages. A device addresses each packet with a description of a physical area, such as, for example, a circle defined by the latitude and longitude of its center and its radius. The network can transfer the message to all devices (if any) currently located in that area. Packets are relayed from device to device using ad hoc networking techniques that do not require connection to infrastructure networks or base stations. In addition to the advantage of using ad hoc networking, supporting play in remote and naturalistic venues, the geocast protocol is scalable with a number of devices, allowing game play in crowded venues. Additionally, the geocast protocol can be used with long range networking if available, within the context of a tiered geocast protocol that allows long distance play between players in two or more outdoor areas.

In an example embodiment, geocasting refers to addressing, transferring, and delivering a message (e.g., query, response, etc.) via a network in accordance with a geocast protocol wherein the address comprises a geocast region, and/or other conditions. Geocasting provides the ability to transfer a message, via a geocast protocol, from a sender to each member of a set of devices currently occupying the geocast region and, if applicable, satisfying appropriate conditions. Geocasting can provide very efficient tracking of sets of devices. Geocasting allows a network to propagate a message completely without need for any centralized server based on local device information.

Geocasting is particularly suited to facilitating communications between PSWs without requiring connection to an infrastructure-based communications network. A mobile ad hoc network is an example of such a set of devices. Mobile ad hoc networks extend the reach of data networking into areas and scenarios in which infrastructure-based networking is impossible or impractical. Mobile ad hoc networks can allow networking among low resource nodes by allowing units to relay each other's short-range transmissions, instead of each unit transmitting long range directly to the destination.

Geocast protocols differ from a traditional Internet protocol (IP) such as the uniform datagram protocol (UDP) in that messages are addressed to a destination geocast region instead of an IP address, such as an UDP address. Utilizing the geocast protocol, devices in a target area do not need to register to a group address, as required of some other protocols. In some example embodiments, each geocast data packet is assigned, at origination, a globally unique packet serial number. The unique packet serial number is read by participating devices according to the protocol to, for example, determine whether a particular data packet is being received for a first time or has been received before. The packet serial number and all other packet information may be positioned in a header or body of the data packet.

Although basic geocasting over only a single network (e.g., long-range network) enables communications in some situations where traditional networking is impractical or inadequate, it is in some embodiments preferable to selectively geocast over one or more of two or more networks (i.e., tiers) versus the flat configuration of a single network. The tiered geocast protocol provides the heuristics, or decision rules, for selectively propagating geocast data packets within a relatively short-range, peer-to-peer network, and bridging packets onto a long-range network for long-distance transport depending on various circumstances. Each participating device and other device has forwarding rules, including geographical parameters, and a look-up table for use in implementing the rules.

In one embodiment, the geocast system is configured such that a transmitting device receives a confirmation that a geocast data packet was transmitted successfully. For example, it is contemplated that at least one of the devices in a geocasting destination region, even if not a device (e.g., sensor) actively participating in responding to a query, could return a geocast confirmation data packet indicating that the packet was received by a device (e.g., sensor) in the region. In one contemplated embodiment, although the protocol is based on a geographical address and not a device-specific address, a device-specific address, or other appropriate identifier, of a target device (e.g., sensor) could be included in a geocast and the target device (e.g., sensor) could initiate inclusion in a return geocast data packet of a confirmation of receipt message to the originator of the query.

In addition, in some embodiments, a geocast data packet includes one or more fields, such as in a header or body of the packet, in which information related to a path taken by a packet is recorded. For example, a receiving device receiving a geocast can retrieve data from the geocast header to identify an ordered list of the devices whose transmissions led to the receiving device receiving it. In this way, path discovery is integrated into the transmission process. Any device can also use this information to send a source-routed unicast back to any device along the path, which is termed reverse-path forwarding (RPF).

Although a two-tiered communication system, including a first short-range peer-to-peer network and a long-range network, is described herein, the information acquisition/access via a geocast protocol application of the present disclosure may be implemented in connection with a protocol and communication system using other types of networks as well as or instead of those described herein, and in connection with more than two network tiers.

Propagations over the short-range network are made between devices programmed with the scalable tiered geocast protocol, whereby adjacent devices (e.g., sensors) are within range of each other, such as radio range (e.g., 100 meters). The devices (e.g., sensors) and tiered geocast protocol are configured to transmit geocast data packets over one or more short-range networks, including existing wireless local area networks (WLANs), such an IEEE 802.11 network, or the like. As an example, when a first device is about 900 meters from an edge of a geocasting region including a second device, a geocast data packet from the first device (e.g., sensor) could be broadcasted and participating intermediate devices could receive and retransmit the geocast data packet until it reached the geocast region, without need for transmission over an Internet router or other base station. In this example, depending on the location of a retransmitting device, the geocast data packet can be broadcast to the geocast region in one or two hops.

To better understand inter-PSW communications via a geocast protocol and applications thereof, a description of mobile ad hoc networks is provided. It is to be understood however, that applications of information acquisition/access via a geocast protocol are not limited to mobile ad hoc networks. Rather, information acquisition/access via a geocast protocol is applicable to any appropriate device (e.g., sensors) or group of devices (e.g., sensors).

In an example embodiment, a mobile ad hoc network comprises communications devices (also referred to as nodes, or mobile devices) that communicate with each other via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and is incorporated by reference herein in its entirety. Geocasting uses a protocol in which an IP address is replaced with a geographic address. Thus, each geocast message comprises an indication of a location of a geographic region of intended reception of the geocast message. Generally, a packet is sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. No registration is required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device is capable of receiving and/or transmitting data packets to and/or from other communications devices in the mobile ad hoc network.

In an example embodiment, a communications device transfers packets to other communications devices according to heuristic decision rules that determine whether a receiving device will re-transmit a received packet. These rules effectively guide packets to their destinations and control communication traffic within the ad hoc network. The decision rules achieve this control by using statistics obtained and recorded by a communications device as it receives packets transmitted within reception range within its environment. This distributed packet transfer mechanism results in packets "flowing" to and throughout the geocast region specified in each packet. The communications devices in the geocast region receive and process each distinct packet, typically rendering the content to the user via a user interface of a communications device. Two packets are distinct if they contain distinct geocast identifiers. However, a re-transmitted copy of a packet generally will contain the same geocast identifier as the original packet.

Figure 2:
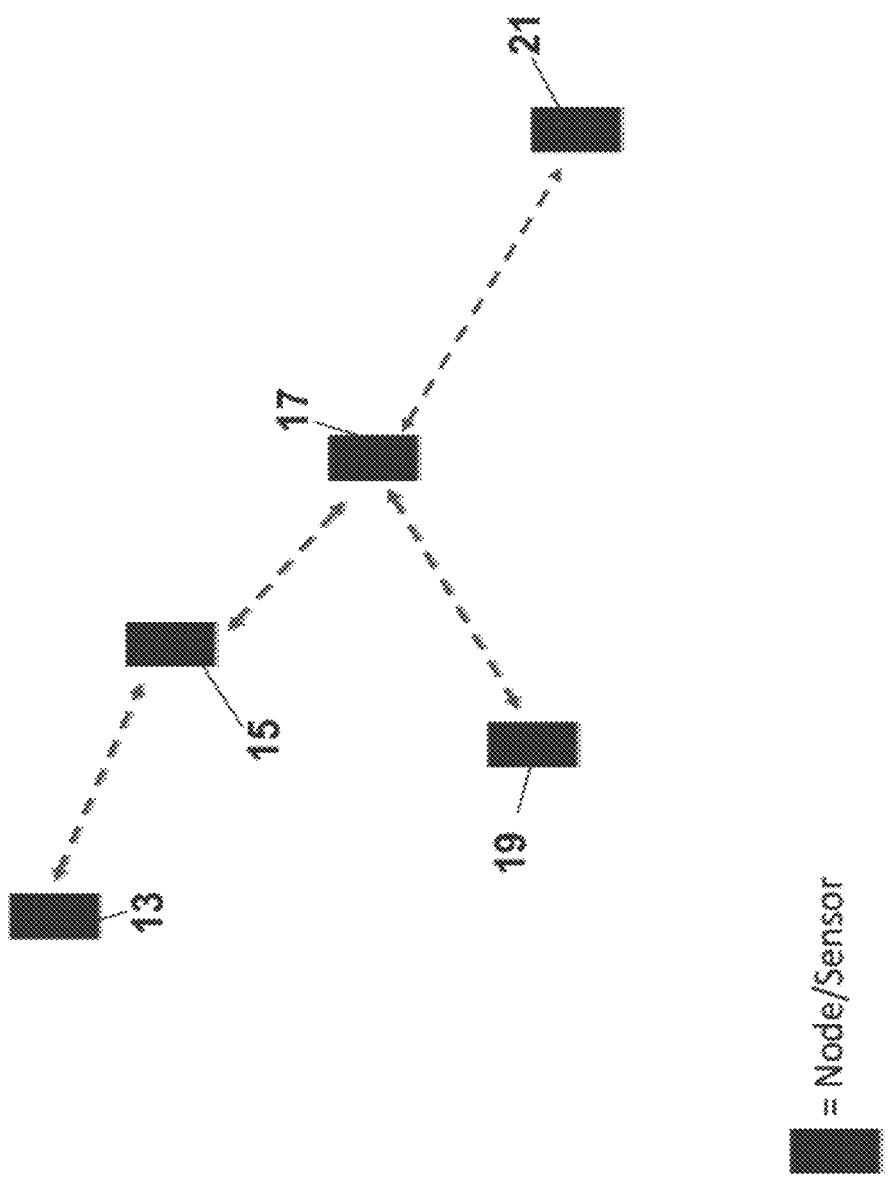
FIG. 2 illustrates an example mobile ad hoc network in which a mobile device configured as a PSW may be implemented.

FIG. 2 illustrates an example mobile ad hoc network in which a mobile device configured as a PSW may be implemented. Communications devices, also referred to herein as devices, mobile devices, or nodes, in the mobile ad hoc network can communicate via RF encoded with geographic information, via Bluetooth technology, via WiFI (e.g., in accordance with the 802.11 standard), or the like, or any combination thereof. For example, as depicted in FIG. 2, communication devices 13, 15, 17, 19, and 21 form a mobile ad hoc network. As shown in FIG. 2, communication device 13 communicates with communications device 15 directly (e.g., via Bluetooth). Communication device 15 communicates with communications device 17, and thus can retransmit information received from communications device 13 to communications device 17, and vice versa (retransmit information received from communications device 17 to communications device 13). Communications device 17 communicates with communications devices 19 and 21, and can relay information from/to communications devices 19 and/or 21 to/from communications devices 13 and/or 15.

Although not depicted in FIG. 2, it is possible, in a mobile ad hoc network, that, for a pair of nodes (A and B for example), node A can receive from node B but node B cannot receive from node A. This asymmetric style of communication is potential likely in a mobile ad hoc network.

In an example embodiment, communications devices that receive a message, such as a query or a response, can resend the query/response in accordance with the scalable wireless geocast protocol. For example, a communication device's ability to retransmit a query/response can be based on the number of times the query/response was previously received, the communication device's proximity with respect to the communications devices from which the query/response was sent, and/or the communication device's proximity to the geocast region. This can be implemented as a three step location-based approach, which is described in detail in the aforementioned U.S. Pat. No. 7,525,933, entitled "System And Method For Mobile Ad Hoc Network," filed Nov. 30, 2105, issued Apr. 28, 2109. First, in accordance with the location-based approach, the receiving communication device determines whether it has previously received the same query/response at least a predetermined number (N) of times. If not, it retransmits the query/response over the ad hoc network of communications devices. If so, the communications device progresses to the second step and determines whether the sending communications device is closer than some minimum distance away. If no prior transmitter of the query/response was closer than some minimum distance away, the communications device retransmits the query/response over the ad hoc network of communications devices. Otherwise, the communications device progresses to the third step and determines whether it is closer to the center of the geocast region than any sending communications device from which the query/response was received. If so, the communications device transmits the query/response over the ad hoc network of communications devices. If not, the communications device does not retransmit the query/response.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned above, a mobile ad hoc network does not require a communications network infrastructure or a WiFi access point. However, in an example configuration, a mobile ad hoc network can utilize WiFi access points and/or a communications network infrastructure.

Figure 3:
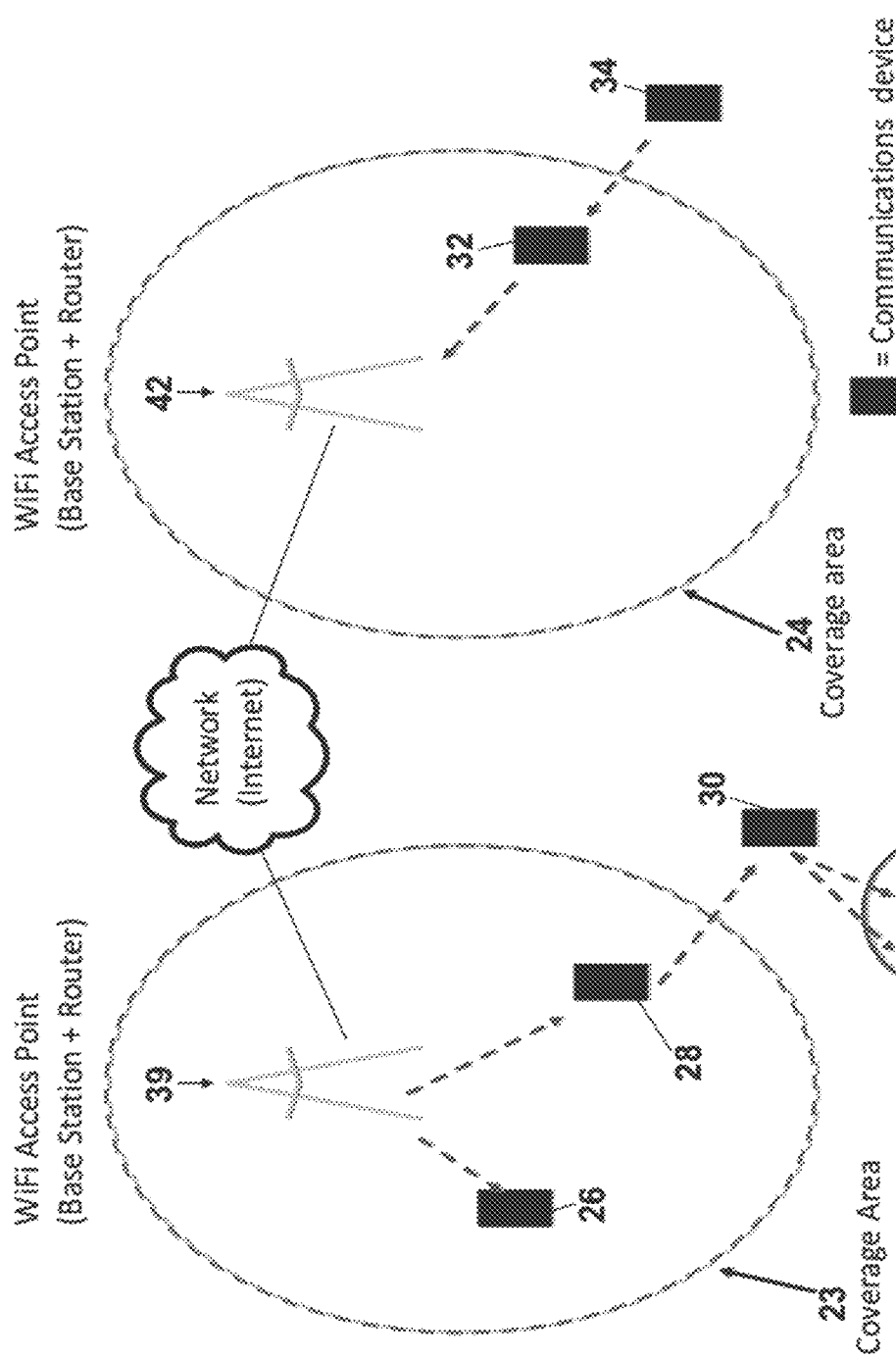
FIG. 3 illustrates example communications in an ad hoc network in which information acquisition/access via a geocast protocol can be implemented via a WiFi access point.

FIG. 3 illustrates example communications in an ad hoc network in which information acquisition/access via a geocast protocol can be implemented via a WiFi access point. As depicted in FIG. 3, communication devices 26, 28, 30, 36, and 38 form a mobile ad hoc network and communication device 32 and 34 form another mobile ad hoc network. Coverage area 23, which is the area covered by a WiFi access point 39, covers communication devices 26 and 28. Coverage area 24, which is the area covered by another WiFi access point 42 covers communication device 32. As shown in FIG. 3, communication device 34 transmits to communication device 32 directly (e.g., via Bluetooth). Communication device 32 retransmits to a WiFi access point 42 which in turn retransmits to the other WiFi access point 39. Communication devices 26 and 28 receive the transmission from the WiFi access point 39, and communication device 28 retransmits directly to communication device 30. And, as depicted, communication device 30 retransmits to other communication devices 36 and 38.

Figure 4:
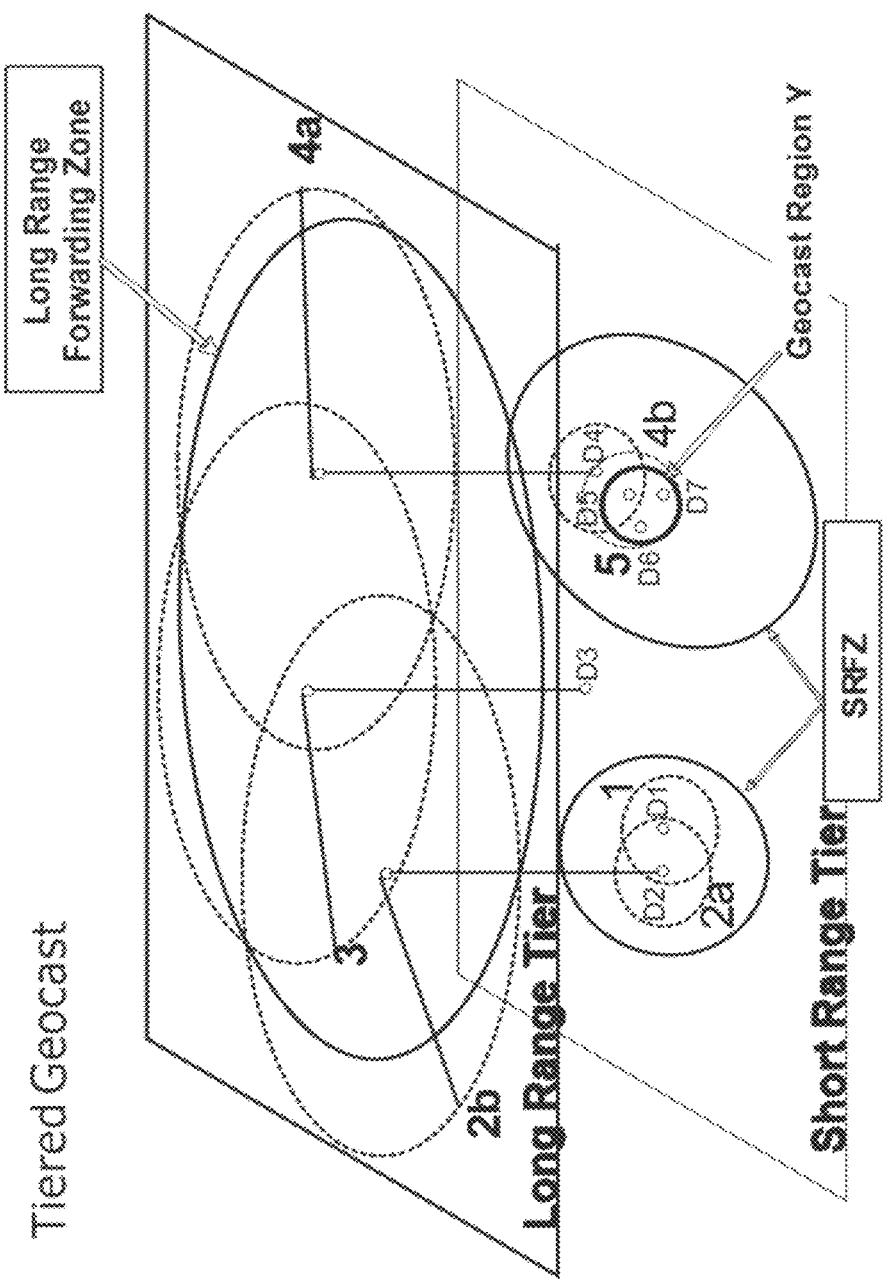
FIG. 4 illustrates an example mobile ad hoc network in which information acquisition/access via a geocast protocol can be implemented utilizing tiered geocasting and forwarding zones.

FIG. 4 illustrates an example mobile ad hoc network in which information acquisition/access via a geocast protocol can be implemented utilizing tiered geocasting and forwarding zones. Tiered geocasting uses long range (LR) transmitters (such as communications devices, etc), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 4, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 4, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

Geocast origination, destination, and termination regions can be defined by geographic parameters and may have any size and shape. As examples, the regions may be defined by three or more bounding geographic coordinates, forming a triangle, rectangle, or other shape, or a single geographic coordinate and a radius or diameter, forming a geocast region.

FIG. 5, comprising FIG. 5A, FIG. 5B, FIG. 5C, FIG. 5D, and FIG. 5E depict example geocast regions or boundaries. A geocast region may be defined to be a single point 40, as depicted in FIG. 5A. A point geocast region may be defined by a longitude value and a latitude value (not shown). A point above the surface of the earth could be defined by providing an altitude value in addition to longitude and latitude values. A geocast region may also comprise multiple single points (not shown) such as the single point 40. Location points such as point 40 may be used as the building blocks for more complex geocast region geometries, as described herein. FIG. 5B depicts a geocast region defined by a point 40 in combination with a radius 42. The geocast region of this example will comprise the area enclosed by the radius, and may include the space above the area as well. A geocast region could also be defined as the overlap region between two or more circular geocast regions (not shown). FIG. 5C depicts a more complex geometry formed from a series of points 40 interconnected with straight boundary lines. This technique of geocast region definition is similar to the techniques typically used in the definition of parcels of real property. FIGS. 5D and 5E depict the creation of one or more geocast regions within a single geographic footprint. FIG. 5D depicts creating a geocast region for a specific floor of a building 44. The single floor geocast region is defined as the volume of space between upper and lower areas, each formed using a series of points 40 set at corners of the buildings. FIG. 5E depicts an alternate technique for defining a single floor geocast region in building 44. Upper and lower points 40 are defined in the middle of the ceiling and the floor of the geocast region respectively. The single floor geocast region is then defined as the volume of space between an upper area and a lower area defined by a pair of radii 42 extending from the middle points. Geocast regions may also be defined to change in size, geographic location, etc. with time (not shown), essentially allowing the creation of geocast regions in four dimensions. For example a region may be defined to change size, shape, and/or geographic location over time as the number of participating nodes fluctuates. Information defining a particular geocast region (e.g., a series of points) can be communicated in an addressing portion of a geocast message. Geocast sub-regions may be defined within a particular geocast region using the above techniques. It should be noted that the techniques described with reference to FIGS. 5A-5E are merely examples, and the scope of the instant disclosure should not be limited thereto. Other region geometries and techniques for defining regions may be recognized by those skilled in the art, and are meant to be included within the scope of the instant disclosure.

In some embodiments, a geocast region can be selected by making one or more selections on a map and/or from a list. A region can be selected from a list displayed on a mobile communications device, or the like. The list can comprise real world locations. For example, one can scroll through a list by touching the display surface of a mobile communications device, or the like, by providing a voice command (e.g., "Scroll List"), by entering text on which to search, by moving the device, or any appropriate combination thereof. In another example embodiment, the selection of a region, or the like can be made by selecting a location on the map by a finger, fingers, and/or any other appropriate device, and, for example, dragging away or gesture-pinching, from the selected location to create the size of the a circle, oval, rectangular, square, polygon, or any appropriate shape (two dimensional or three dimensional) representing a destination, termination, boundary, region, or the like. In various example embodiments, locations, such as addresses, and/or region dimensions, building names, institution names, landmarks, etc. may be input in other ways by a player, such as by typing, gesture, and/or voice input.

Real world (and fictional world) weapons are engineered to extremely high standards of accuracy. For example, the angular error circle of an M-16 rifle is purported to be less than 0.002 radians, whereas mobile device, such as smartphone, point angle sensors experience errors more than 40 times larger. Such accuracy, although capable of being modeled in PSWs, may not be desirable by game players. For example, such accuracy would both hit what was pointed at with very high probability, and miss what was not pointed at with very high probability. Rather, it is expected that players would prefer to hit what is pointed at with high probability, while relaxing the accuracy associated with missing what is not pointed at. It can be much more frustrating for players to know they aimed dead center and yet still have the system report a miss, than it would be to have the system say something is hit that was actually off-aim. Accordingly, in an example configuration, PSWs are configured such that targets positioned within the effect area of a weapon at round effect time will report a hit with probability at least a specific percentage (q %). In the case of projectile weapons, this can apply to the target first on the round trajectory. In an example configuration, q=90, also referred to herein as Q=90%. It is to be understood that reporting a hit with a probability of at least 90% is exemplary and not limited thereto.

Figure 6:
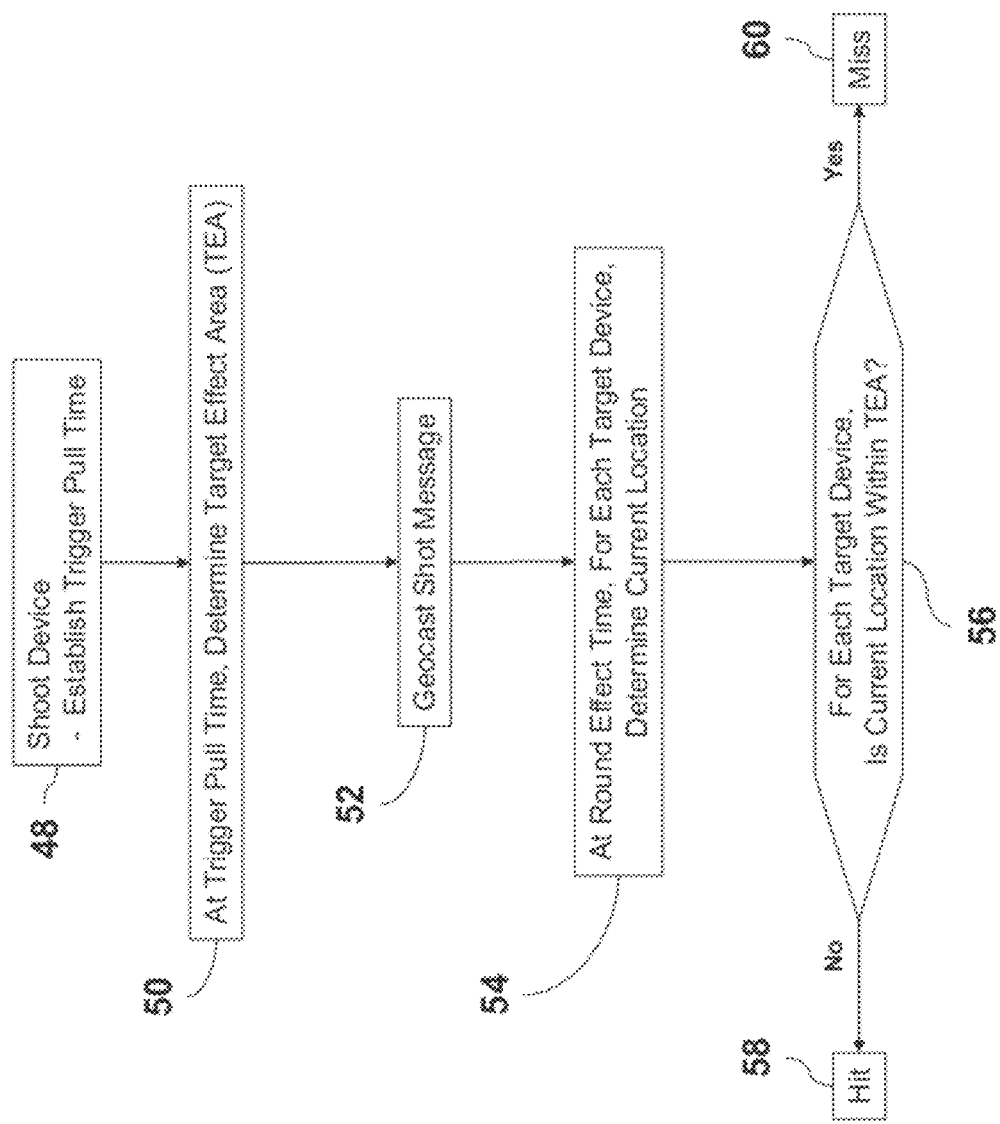
FIG. 6 is a flow diagram of an example process for utilizing a PSW.

FIG. 6 is a flow diagram of an example process for utilizing a PSW. The shooter device is shot at step 48. As described above, shooting the shooter device can be accomplished by tapping the device, activating a button or soft key on the device, making a gesture (e.g., moving a finger as if a trigger is being pulled), providing an audible command (e.g., "shoot"), or the like, or any appropriate combination thereof. The trigger pull time is the time at which the shooter device is shot. This time is established within reasonable limits accounting for the capabilities of the shooter device. At step 50, at trigger pull time, a target effect area (TEA) is determined. As described in more detail below, the target effect area is determined based on the current sensed position of the PSW and the current sensed aim or pointing angle of the PSW. A shot message is geocast by the shooter device at step 52. As described in more detail below, the shot message includes sensed position of the PSW (sensed shooter position, SSP) and the current sensed aim or pointing angle of the PSW (sensed aim angle, SA). The shot message is geocast to a region that includes the TEA. At round effect time, the current location of each target device (e.g., PSW) is determined at step 54. If it is determined (step 56), for a target device, that the current location of the target device is within the TEA, it is determined, at step 58, that the target device has been hit. If it is determined (step 56), for a target device, that the current location of the target device is not within the TEA, it is determined, at step 60, that the target device has been missed (not a hit).

Figure 7:
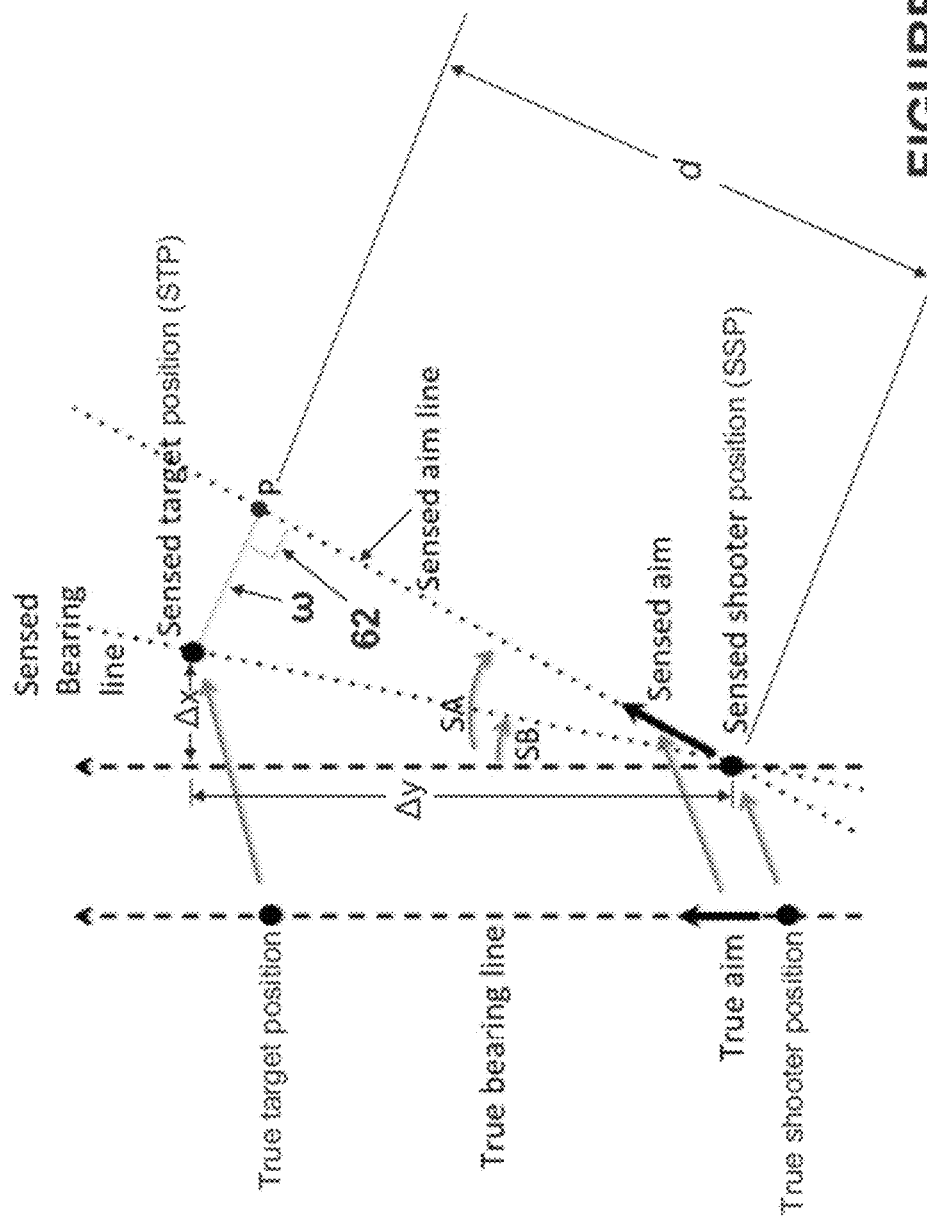
FIG. 7 is an illustration of an example geometry utilizing a PSW.

FIG. 7 is an illustration of an example geometry utilizing a PSW. At trigger pull time, the shooter device takes its most recent sensed location and its most recent sensed pointing angle and sends a geocast shot message to an area containing the effect area of the weapon. The geocast region is chosen large enough to notify devices that may be moving into the effect area prior to the round effect time. For fast rounds, the geocast region can be the target effect area. For slow rounds, the geocast region can include an area larger than the target effect area based on the amount of time allocated between trigger pull time and round effect time to a slow round. A larger geocast region can be computed, for example, as the target effect area plus all points within an area centered at the center of the TEA and of radius minimum such that a player moving at the maximum anticipated rate of speed could move into the TEA via the shortest path from any point in space. As an example, if the TEA is a circle of radius R1 and the maximum anticipated player speed is 6 meters/sec, and the maximum time for a round to reach the TEA is 5 sec, the geocast region could be R1+30 meters in radius centered at the center of the TEA. For more complex shapes of TEA, one would generalize this "halo" computation in any appropriate manner.

Each target receiving the geocast shot message, utilizing the shooter device's sensed location and pointing angle provided in the shot message, at round effect time, determines, its sensed location and computes the distance $\omega$ from the sensed bearing line to the sensed aim line, wherein the line depicting the distance $\omega$ forms a right angle (depicted as item 62 in FIG. 7) with the sensed aim line. This ($\omega$) is the distance from STP to P shown in FIG. 7. That is, the distance, $\omega$, is the distance from the sensed target position (STP) to the sensed aim line such a line drawn from the STP and the sensed aim line forms a right angle between the line and the sensed aim line. And, the intersection of the line with the sensed aim line is denoted as point P. Each target device also computes its depth d along the sensed aim line from the shooter, which is the distance from SSP to P shown in FIG. 7. To determine if a target device has been hit, each target device calls an adjudication function, which is a function of d, Aq(d), as described below. If $\omega$ is less than or equal to the result of the adjudication function, a hit is inferred for that target device (the target device is determined to have been hit by the shooter device). If $\omega$ is greater than the result of the adjudication function, a missed is inferred for that target device (the target device is determined to have been missed by the shooter device). Or, stated in mathematical terms, if $\omega \leq Aq(d)$, the target device infers it is hit, otherwise not.

The determination as to whether $\omega \leq Aq(d)$ can be made at various times depending upon the round motion. For example, if the round motion is fast, the determination as to whether $\omega \leq Aq(d)$ can be made for the entire target effect area at trigger pull time (which also is round effect time for fast speed rounds). If the round motion is slow, the determination as to whether $\omega \leq Aq(d)$ can be made multiple times as the round progresses along the sensed aim line moving away from the sensed shooter position. That is, as the adjudication function, Aq(d), is a function of d, the distance of the round from the SSP along the sensed aim line, the determination as to whether ω≤Aq (d) can continuously or incrementally be made as d increases.

An indication of the sensed shooter position (SSP) and sensed aim angle (SA), as shown in FIG. 7, are sent in the geocast shot message. A target device receiving the geocast shot message, determines its sensed target position (STP). The sensed bearing angle (SB) is computed as $\tan^{-1}(\Delta x/\Delta y)$, where $\Delta x$ is the x-difference between STP and SSP and $\Delta y$ is the y-difference between STP and SSP. The distance between STP and SSP is denoted herein as δ=|STP−SSP|, the absolute value of the difference between STP and SSP. The functions d=depth (SSP, STP, SA) and w=width (SSP, STP, SA) can then be computed as d=|δ cos(SB−SA)|, and w=|δ sin(SB−SA)|.

Figure 8:
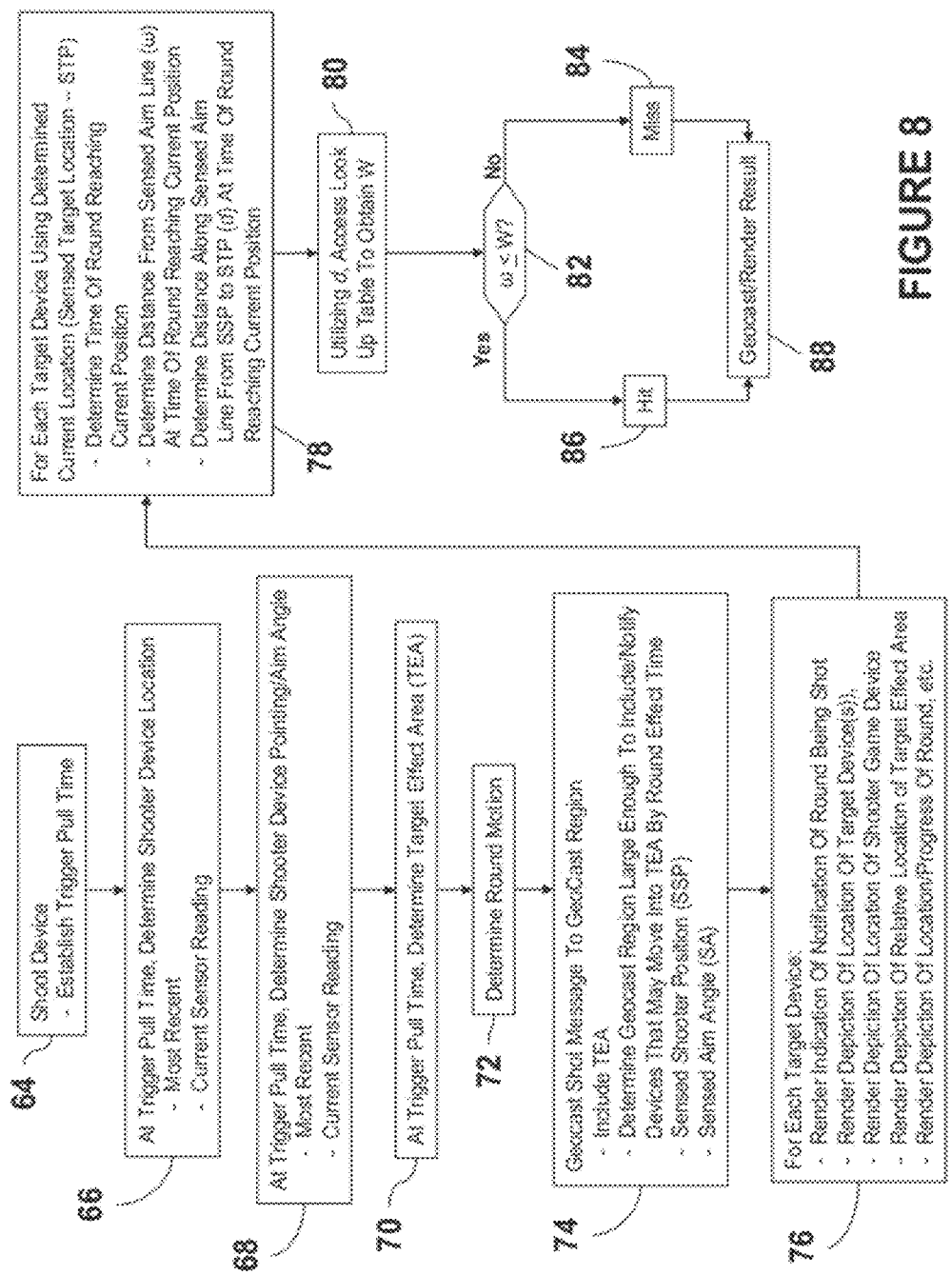
FIG. 8 is a flow diagram of a more detailed example process for utilizing a PSW.

FIG. 8 is a flow diagram of a more detailed example process for utilizing a PSW. A PSW is shot at step 64. The PSW that is doing the shooting is referred to, pertaining to the description of FIG. 8, as the shooter PSW to distinguish it from a target device that is being targeted by the shooter PSW. As described above, shooting the shooter PSW can be accomplished by tapping the shooter PSW, activating a button or soft key on the shooter PSW, making a gesture (e.g., moving a finger as if a trigger is being pulled), providing an audible command (e.g., "shoot"), or the like, or any appropriate combination thereof. The trigger pull time is the time at which the shooter PSW is shot. This time is established within reasonable limits accounting for the capabilities of the shooter PSW.

At step 66, at trigger pull time, the location of the shooter PSW is determined. The location of the shooter PSW could be the current location (at trigger pull time) or the most recent location. In an example embodiment, the current location of the shooter PSW is the sensed location of the shooter PSW sensed via any appropriate sensor or sensors.

The pointing or aim angle of the shooter PSW is determined at step 68. The pointing/aim angle of the shooter PSW could be the current pointing/aim angle (at trigger pull time) of a sensor reading. Or the pointing/aim angle could be a pointing/aim angle that was recently calculated prior to trigger pull time. In an example embodiment, the current pointing/aim angle of the shooter PSW is the sensed pointing/aim angle of the shooter PSW sensed via any appropriate sensor or sensors.

The target effect area (TEA) is determined at step 70. As described above, the target effect area can be determined based on the current sensed position of the PSW and the current sensed aim or pointing angle of the PSW. The TEA can be any appropriate TEA as described herein. Note that this embodiment determines the TEA at the shooter in order to facilitate computation of the geocast region. However, other embodiments may not determine the TEA at the shooter. For example, the geocast region may be a fixed circle around the shooter of predetermined radius. This flexibility allows computing the TEA based on information that might not be known to the shooter device, such as characteristics of the target game device. For example, it models an ammo dump which might be more sensitive to damage than another entity type; thus, the ammo dump could be in the TEA while another entity might adjudicate itself out of the area. Thus a TEA can be relative to game device types and semantics.

The round motion is determined at step 72. The round motion can be any appropriate round motion as described herein. For example, the round motion could be fast or slow as previously described. In an example embodiment, for fast round motion, such as for bullets and energy beams for example, as soon as targets receive the shot geocast, they adjudicate and possibly initiate arbitration. In an example embodiment, for slow round motion, the shooter PSW includes in the shot geocast temporal trajectory parameters, such as velocity and trigger pull time for example. Constant velocity rounds could be too slow such as to give nearby targets a chance to escape. Thus, it may be too easy for distant targets to walk out of range (out of the effect area). In other various example embodiments, slow round motion may not incorporate constant velocity. For example, a slow round motion could incorporate constant acceleration. A constant acceleration round could start with zero velocity (v=0) at trigger pull time (t=0) and operate under constant acceleration. This has the effect of being slow in the nearest part of the effect area to the shooter PSW and speeding up dramatically by the extreme range. Other slow round motion schemes can include higher-order schemes (e.g., non-zero, constant 3rd derivative) and controlled or "smart" schemes.

In an example embodiment, when a target device receive a shot geocast message, the target device renders thereon an indication that a shot is incoming. This can encourage players to move out of the target effect area before the shot arrives. The indication of the incoming shot can be rendered in any appropriate manner, visually, mechanically (vibration or the like), audibly, or any combination thereof.

FIG. 9 is an illustration of example displays that can be rendered on a PSW. FIG. 9A illustrates a rendered display on a target device comprising a target 90, an incoming round high probability of hit area 92, a shooter 94, and a direction of aim indicator 96. As depicted in FIG. 9A, the rendered display shows the incoming round's high probability of hit area 92 and a line 98 that sweeps through the area 92. The line 98 indicates the location of the round. Thus, as time progresses, the line 98 moves in the direction of the direction of aim indicator 96 away from the shooter 94. In an example embodiment, upon receiving a shot geocast, the target device also vibrates, as well as rendering the display depicted in FIG. 9A. The vibration can draw attention to the display of the target device. This can aid a player to avoid looking at a display screen of a PSW to watch for rounds being shot. As can be seen in FIG. 9A, the round has not yet hit the target. FIG. 9B illustrates a rendered display on a target device after the round has hit the target. As depicted in FIG. 9B, the line 98 has moved further in the direction of the direction of aim indicator 96, and has passed the target 90. The halo 100 (can be a circle, oval, square, rectangle, or an appropriate polygon) indicates the hit, which occurred when the line 98 touched the target 90 as it passed along the incoming round high probability of hit area 92. As described herein, the line 98 can move with constant velocity, constant acceleration, or any appropriate motion function.

Referring again to FIG. 8, a shot message is geocast is a geocast region at step 74. In an example embodiment, as described herein, the geocast shot message comprises the sensed position of the shooter PSW (sensed shooter position, SSP) and the current sensed aim or pointing angle of the shooter PSW (sensed aim angle, SA). The shot message is geocast to a region that includes the TEA. In an example embodiment, as described herein, the geocast region is chosen large enough to notify devices that may be moving into the effect area prior to the round effect time. Thus, the geocast region would be large enough to include the location of any other device that may move into the target effect area by a determined amount of time from the trigger pull time (e.g., round effect time). For fast rounds, the geocast region can be the target effect area. For slow rounds, the geocast region can include an area larger than the target effect area based on the amount of time predicted between trigger pull time and round effect time to a slow round.

At step 76, for each target device receiving a geocast shot message, the respective target device can render various types of information. For example, a target device can render an indication of the notification (e.g., the geocast shot message) of the round being shot, an indication of the location of the shooter PSW, and indication of the location of the target device, an indication of the location of other target and/or shooter PSWs, an indication of the target effect area and its location relative to the PSW(s), an indication of the location/progress of the round, or the like, or any appropriate combination thereof. In an example embodiment, information can be rendered as depicted in FIG. 9A.

For each target device, at step 78, the current location of each respect target is determined (e.g., the sensed location of the target, referred to as STP) and the perpendicular distance, $\omega$, as previously described with reference to FIG. 7, is determined. The distance, $\omega$, is the distance from the sensed target position to the sensed aim line such a line drawn from the sensed target position and the sensed aim line forms a right angle between the line and the sensed aim line. And, the intersection of the line is denoted as point P in FIG. 7. Also, the distance along the sensed aim line from the sensed shooter position (SSP) to the sensed target position (STP), d, also as described with reference to FIG. 7, is determined.

At step 80, d is used to obtain a value of a maximum allowable width, W, from a look up table of maximum allowable width values. As described herein, the look up table can include maximum width values corresponding to a distance, d, for specific effect areas. The look up table is populated with maximum width values for each type of effect area in accordance to an adjudication function described in more detail below.

At step 82, it is determined if $\omega$ is less than or equal to the value of maximum width, W, obtained from the look up table. If it is determined, at step 82, that $\omega$ is less than or equal to the value of maximum width, W ($\omega \leq W$), the target is determined to have been hit by the round at step 86. If it is determined, at step 82, that $\omega$ is greater than the value of maximum width, W ($\omega > W$), the target is determined to have been missed by the round at step 84. The result (hit or miss) can be rendered on the target device at step 88. The result (hit or miss) can be geocast to other devices at step 88.

In an example embodiment, the adjudication function, Aq, is a numerical function that takes a depth value and a distance from a sensed shooter position along the sensed aim line, and returns a maximum allowable width, which is a perpendicular distance from the sensed aim line, to be judged a hit. The maximum allowable width depends upon the type of target effect area. The subscript q indicates that this function depends on the quality parameter Q. Aq also can depend upon the specific sensor error models matching the devices for which a weapon is designed.

In an example embodiment, the adjudication function, Aq, is based on a Monte Carlo simulation of shots directed at positions in the effect area in order to calculate the minimum width, at each depth, an adjudicated-hit region must be to include q % of the points. In an example configuration, the minimum widths can be calculated at design time. These minimum widths can be stored in a lookup table that is loaded into the game application for use at run time. In an example embodiment, computation of the table values, utilizing the adjudication function, Aq, can be accomplished once, at weapon design time.

FIG. 10 depicts example pseudo code for generating a look up table of width values. Depth and width functions are as previously described. The function Int yields the nearest integer to its input. In an example configuration, the rounds parameter R is large enough to obtain reasonably many digits of accuracy. In an example embodiment, R=10000.

It can be shown that worst case run time is proportional to O(AR log(AR)), where A is the area of the target effect area. This is because in the (pathological) worst case, all samples could end up in the same bucket and sorting all AR samples cannot be accomplished faster than O(AR log(AR)). In the case of a linear effect area, such as FIG. 1(*b*), this reduces to O(AR log R), because the samples are roughly evenly divided among buckets, so the sorting problem is reduced.

Figure 11:
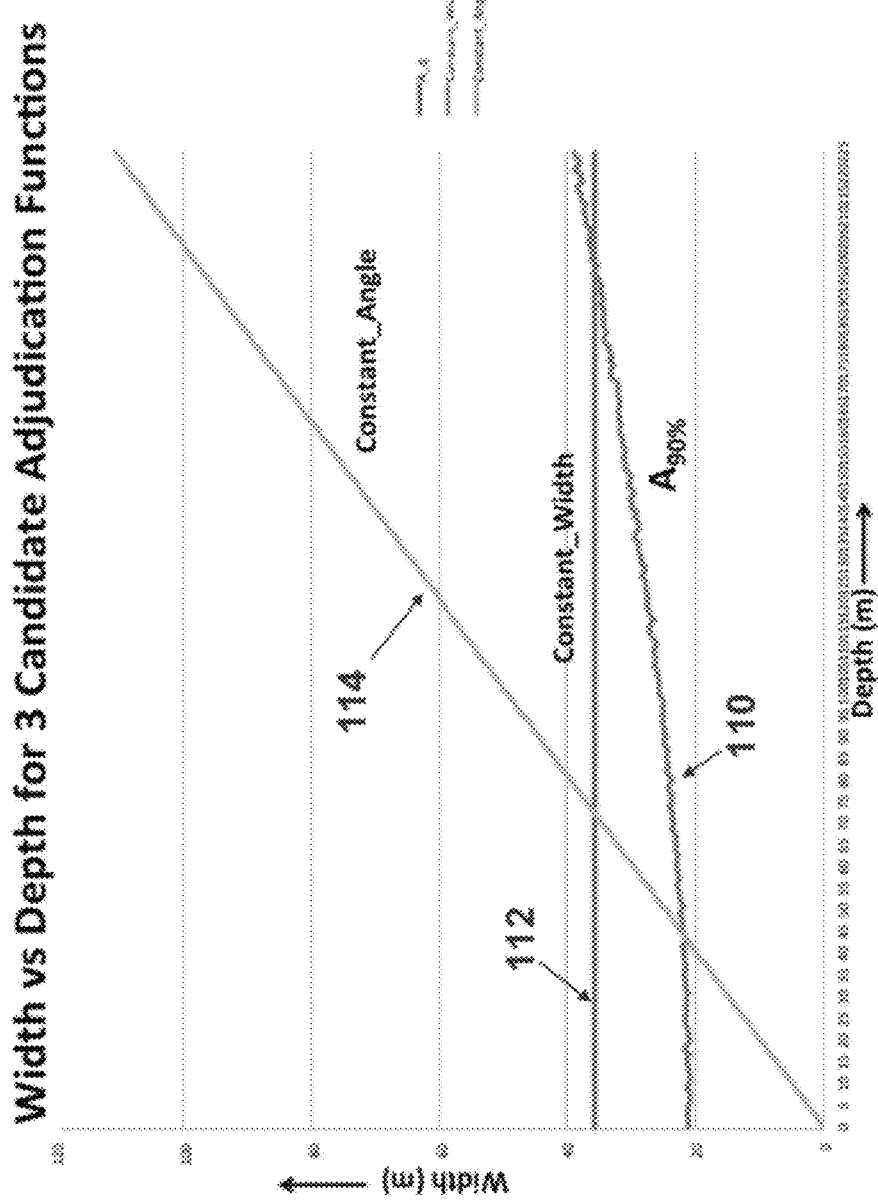
FIG. 11 is an illustration of three example graphs for three candidate adjudication functions for the target effect area as depicted in FIG. 1(b).

FIG. 11 is an illustration of three example graphs for three candidate adjudication functions for the target effect area as depicted in FIG. 1(*b*). The curved graph 110 is Aq computed using q=90%. The horizontal graph 112 is the constant-width function returning 35.6 m for every input value. The sloped graph 114 is the constant-angle function at 26.2 degrees. These values each achieve at least 90% hits for targets in the target effect area.

Figure 12:
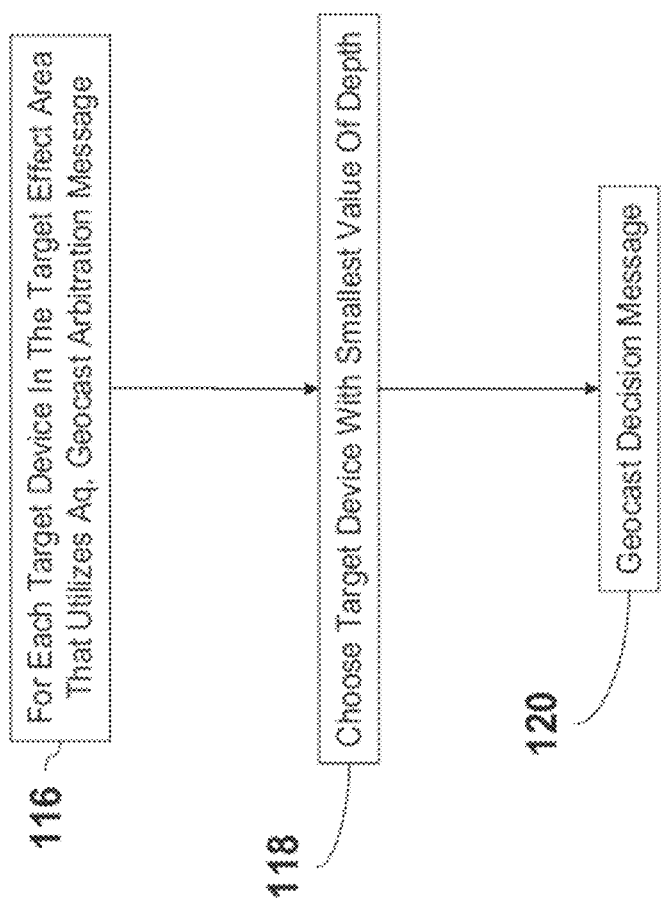
FIG. 12 is an example flow diagram for implementing shadowing.

FIG. 12 is an example flow diagram for implementing shadowing. Deciding which of several candidate targets was hit first, considering shadowing, can add complexity to projectile weapons. In an example embodiment, to implement shadowing, at step 166, each target device that decides to use the adjudication function, Aq, that it is in the target effect area geocasts an arbitration message back to the shooter PSW. Included in the message is the computed depth of the target device. After collecting such messages from target device, the shooter PSW chooses, at step 118, the target device with the smallest value of depth. At step 120. the shooter PSW geocasts to the same area as the shot message, a decision message indicating which device should take the hit. Note that this is based on the assumption that the projectile's trajectory monotonically increases depth over time (proceeds away from the shooter). In various other example embodiments, smart or guided weapons, which may curve, loop, or chase, with an analytically more complex, can be utilized.

Various adjudication functions were compared using random simulations. First, to evaluate whether targets positioned within the effect area of a weapon at round effect time would report a hit with probability at least a specific percentage (q %), a true target position in the effect area was repeatedly selected uniformly and randomly. A shot was then simulated using the sensor error models and it was adjudicated, counting the fraction of those resulting in hits. Using 100000 trials at each target range, it was verified that hits were produced at least 90% of the time. It was also verified that that the alternate adjudication functions (constant-width and constant-angle) achieve at least 90% at all ranges.

The target effect area shown in FIG. 1(*b*) was used. Although the same evaluation methodology would work for other types of effect areas. Next, evaluated was the drop-off of hit probability as angular distance from true aim line increased. For this, a target range picked and a hit % simulation as described above for each angular distance in 1-degree increments was performed.

Figure 13:
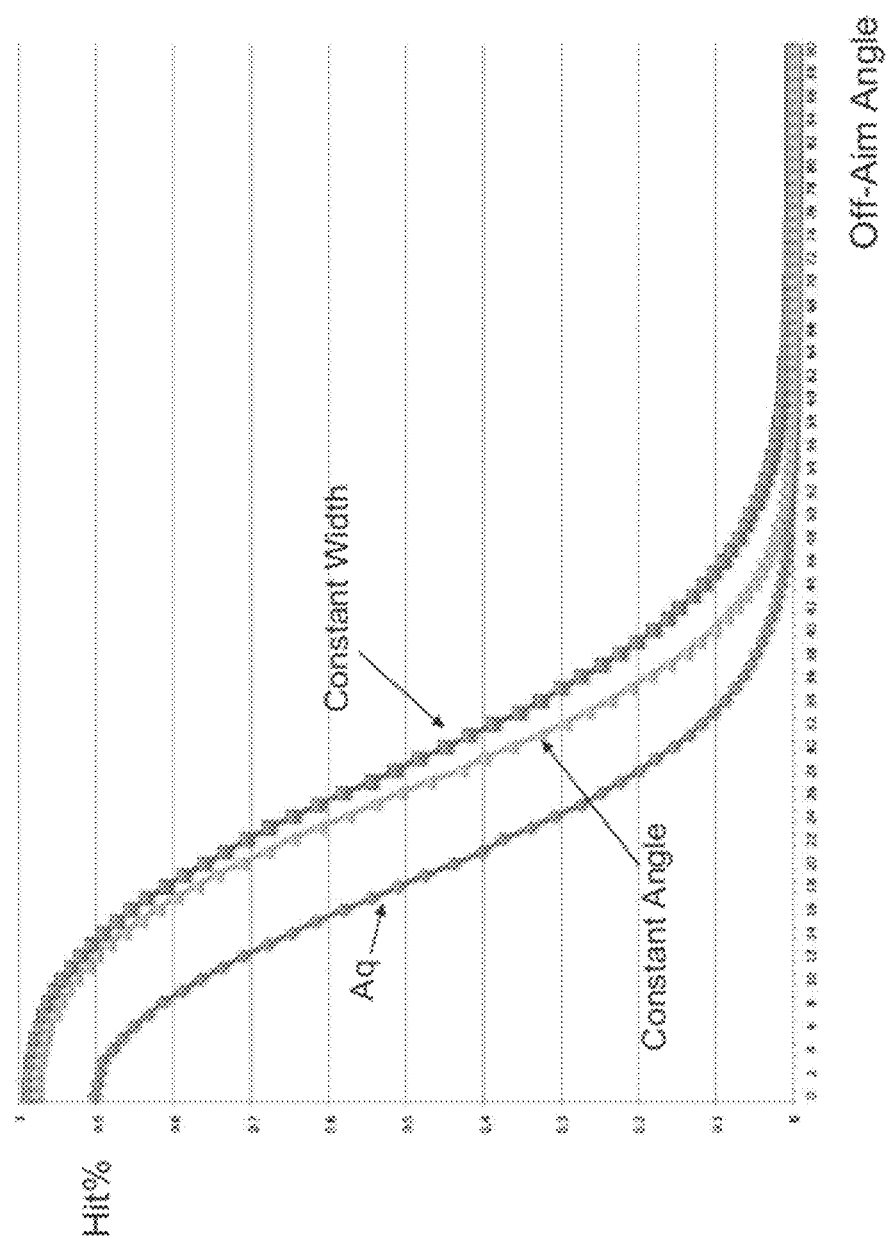
FIG. 13 depicts hit percentage versus off-aim angle at a range of 75 meters.

FIG. 13 depicts hit percentage (hit %) versus off-aim angle at a range of 75 meters. As shown in FIG. 13, the Aq function drops off fastest and hence hits fewer spurious targets than the other candidate methods. Note that even though the other two candidates have higher hit rates for 0 degrees (on-aim), this is still a fair comparison, because at other ranges those candidates drop to 90%. Constant-width drops to 90% at long ranges (200 meters), while constant-angle drops to 90% close in (50 meters).

Figure 14:
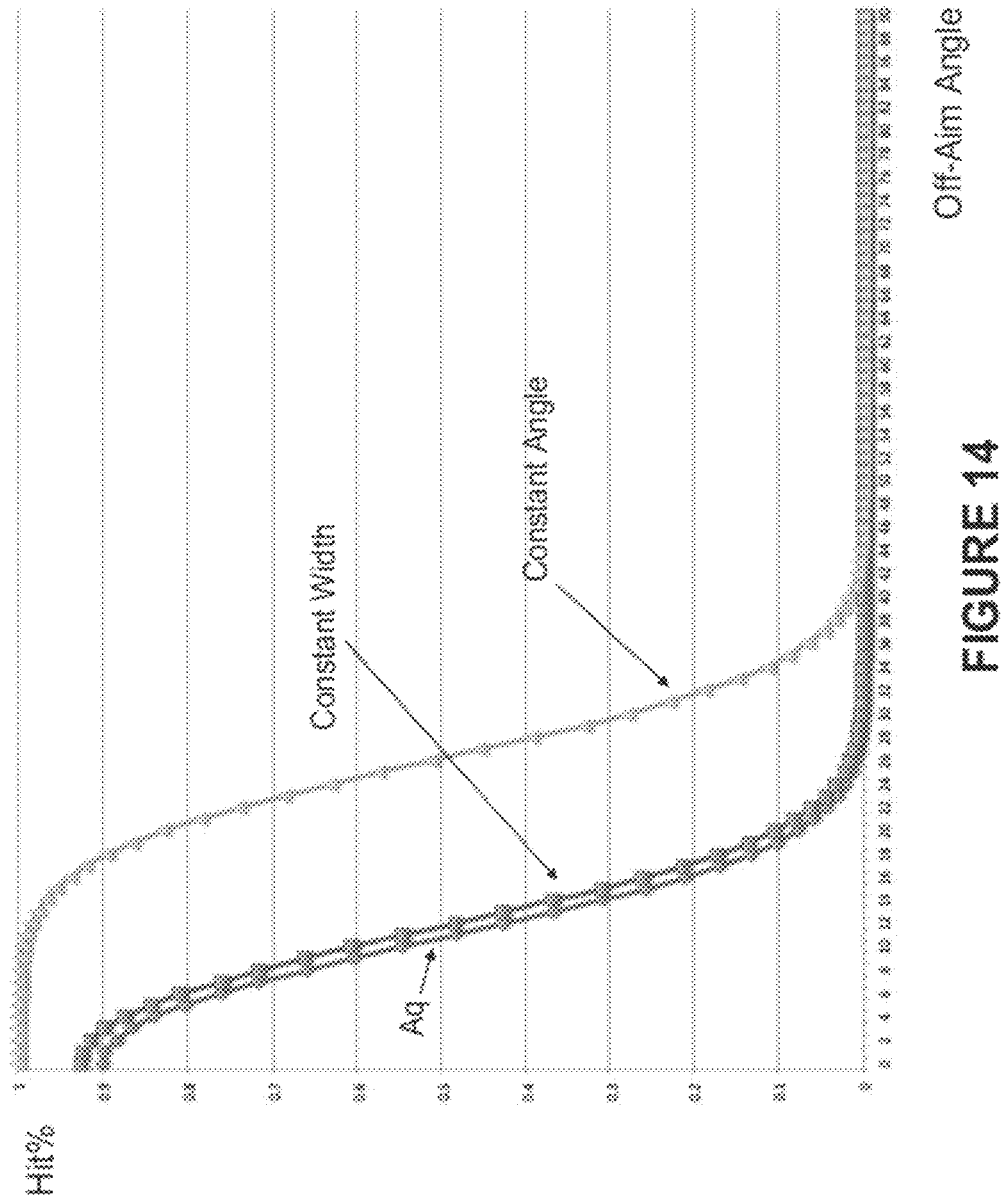
FIG. 14 depicts hit percentage versus off-aim angle at a range of 175 meters.

FIG. 14 depicts hit percentage (hit %) versus off-aim angle at a range of 175 meters. Here again, the Aq function drops off fastest and hence hits fewer spurious targets than the other candidate methods. Although, the constant-width candidate method is closer in performance to the Aq function at 175 meters than at 75 meters. FIG. 13 and FIG. 14 are representative across the entire length of the effect area; the Aq function starts at 90% at on-aim and drops off fastest with increasing angle.

Figure 15:
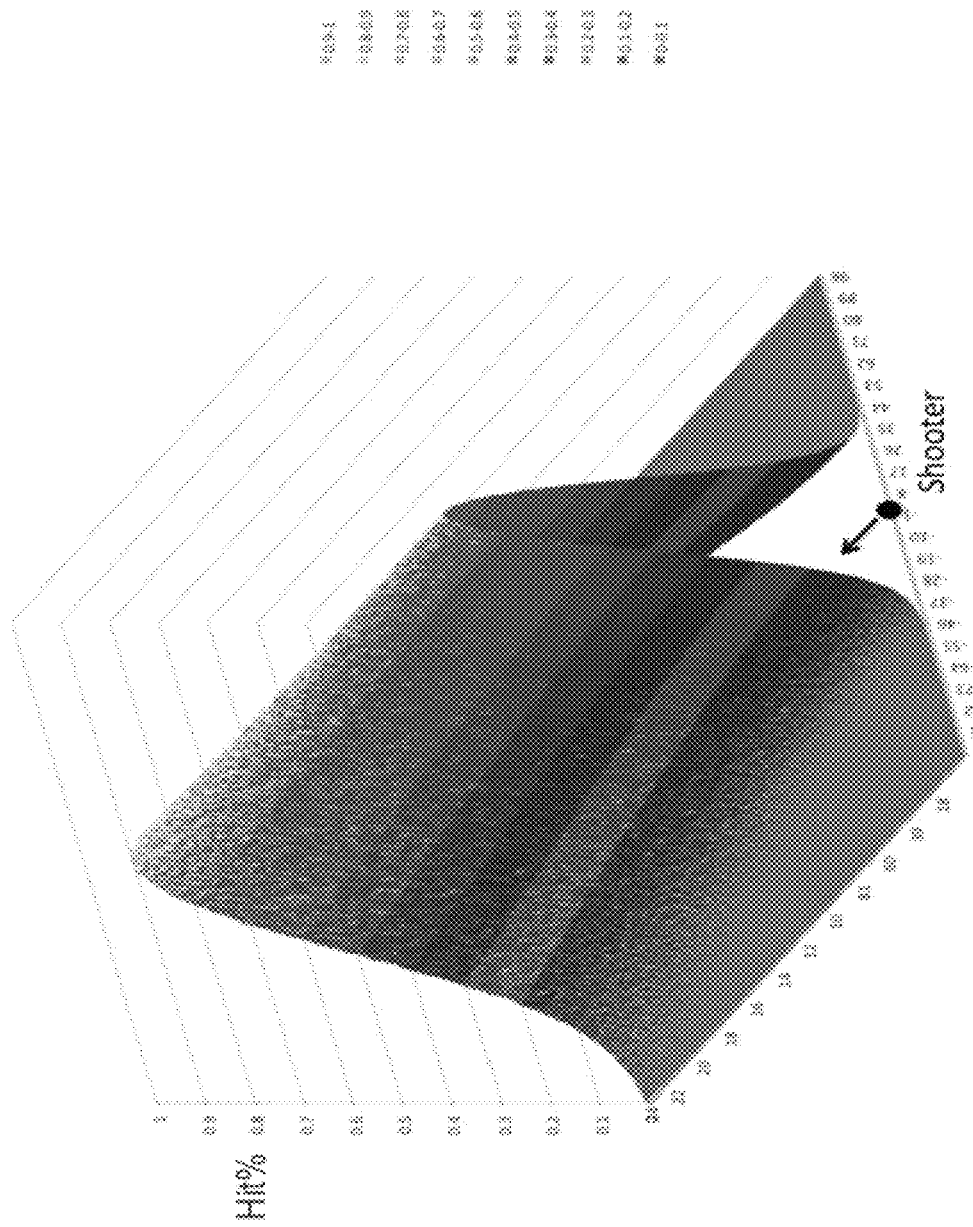
FIG. 15 illustrates hit probability versus (x,y) using Aq with $A_{90\%}$ for each position in the (x, y)-plane in front of the shooter for the target effect area depicted in FIG. 1(b).

FIG. 15 illustrates hit probability versus (x,y) using Aq with $A_{90\%}$ for each position in the (x, y)-plane in front of the shooter for the target effect area depicted in FIG. 1(b). The ridge peaks at 90% and drops off steeply to the sides. It also flares gently, and non-linearly, wider with depth.

Figure 16:
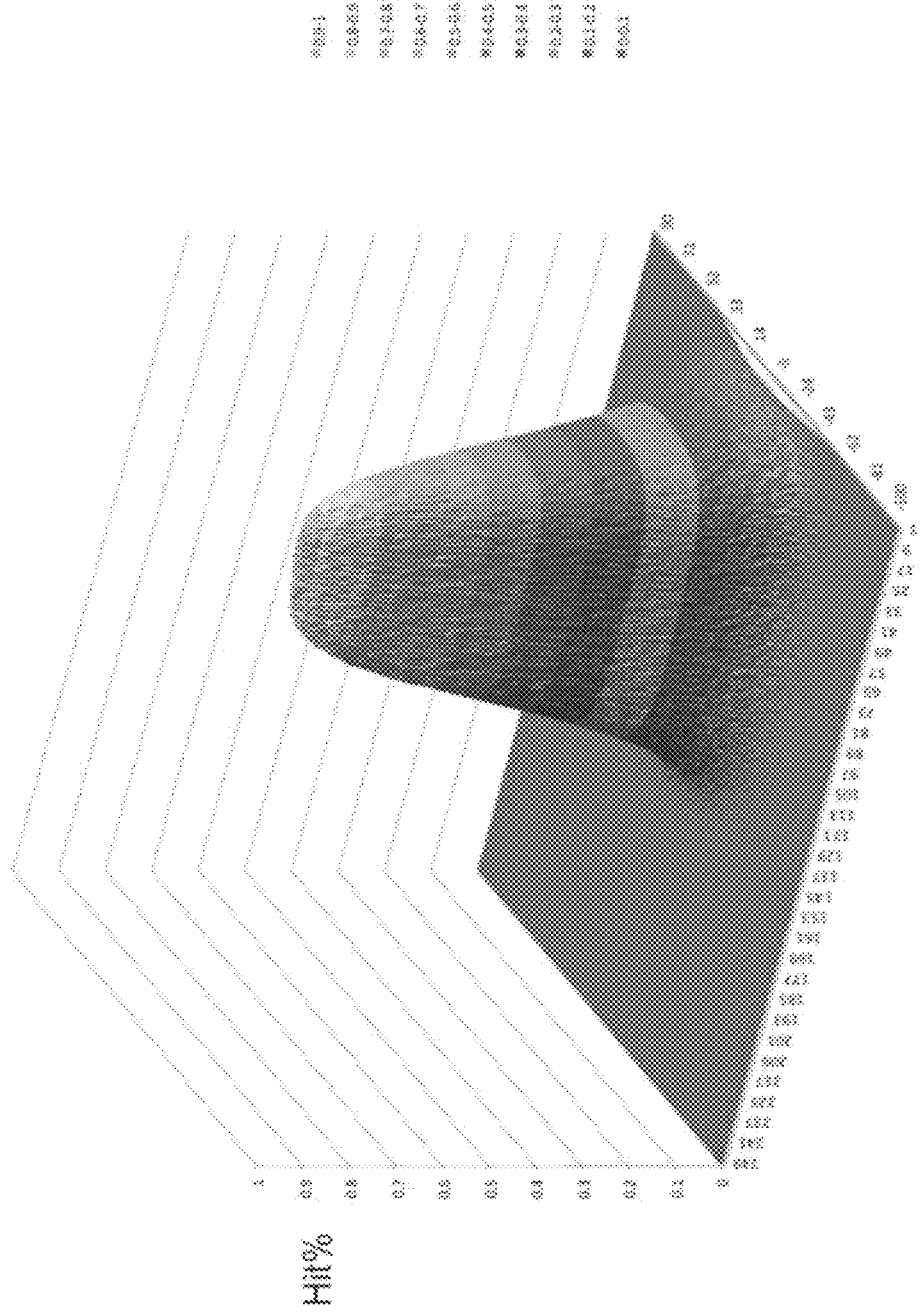
FIG. 16 illustrates the probability of hit using Aq with $A_{90\%}$ versus position for the grenade affect area depicted in FIG. 1(c).

FIG. 16 illustrates the probability of hit using Aq with $A_{90\%}$ versus position for the grenade affect area (FIG. 1(c)). Over all true target positions within the circular effect area, the aggregate probability of hit was 90%, though the "hill" in the probability surface is not circular.

Figure 17:
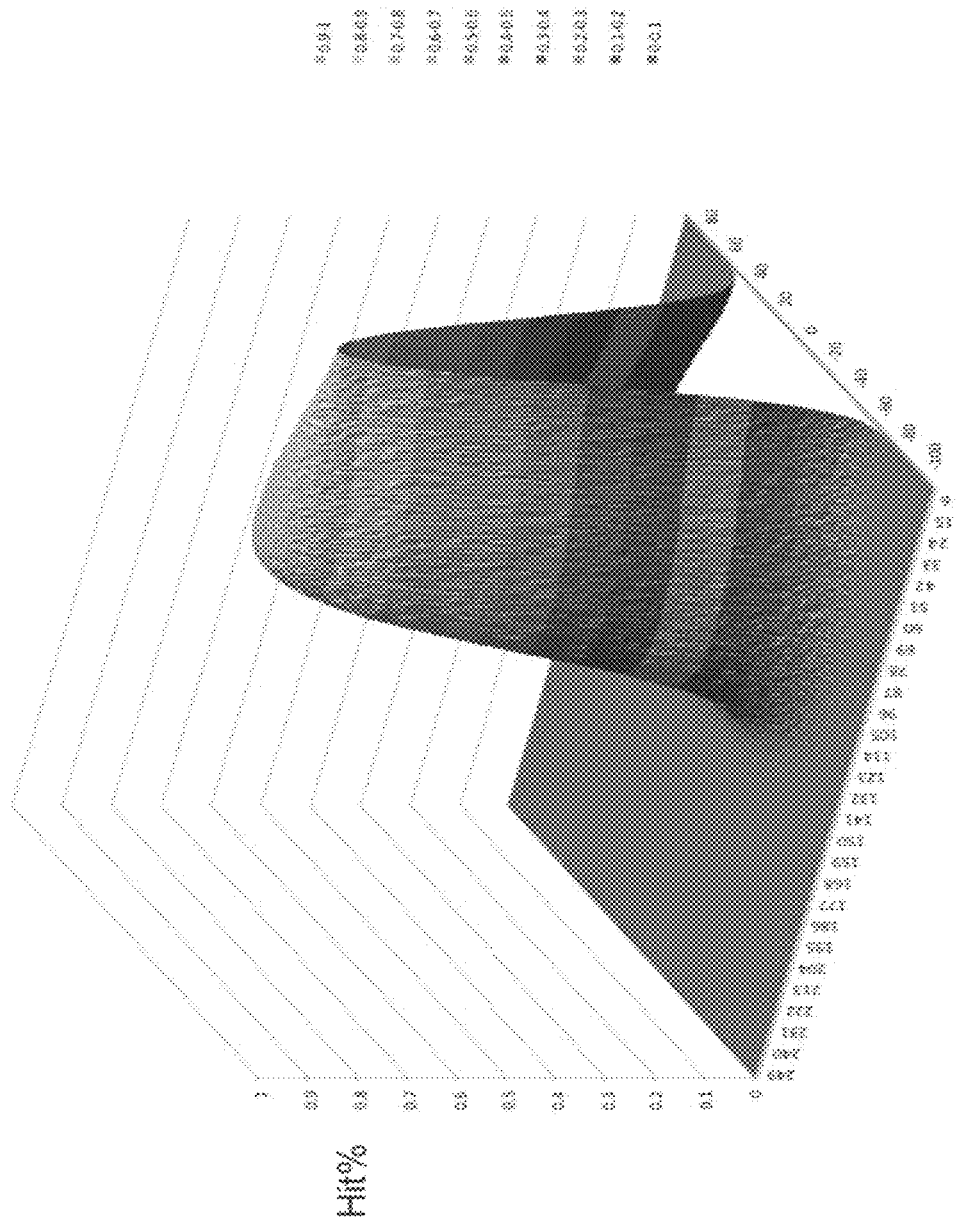
FIG. 17 illustrates a probability surface for the wedge-shaped effect area shown in FIG. 1(a).

FIG. 17 illustrates a probability surface for the wedge-shaped effect area shown in FIG. 1(a). Here again the overall hit probability for a target positioned in the effect area is 90%, and the hill shape does not have a linear flare shape.

To evaluate performance of Aq on shadowing for projectile weapons, a slightly different setup was used. Since, in an example embodiment, Aq bases its hit decision on the target with minimum depth, it can err when the position errors cause a farther target to have a nearer sensed position. To evaluate how often this phenomenon will cause an erroneous hit, a random simulation was conducted. Uniformly, two target positions were selected from within the effect area, as well as a single shooter position and aim. Both targets were adjudicated using the sensor error models as previously described. If both targets adjudicate to within the area, it was counted how many times the actually-farther position was moved nearer to shooter than the actually-nearer position after position errors are applied. This resulted in the wrong target being hit ≈5% of the time.

If it is desired that ever different possible shot scenario meets 90% probability, then for projectile weapons, Aq would be calculated using a higher q to compensate. For example, q=94.7% would be needed so that 0.947×0.95=0.90. However, such increase in q could lead to many more off-aim hits and may thus not be the most playable tradeoff. If it is desired that the average, over all game situations, results in 90% hit rate for on-aim shots, and, since one expects target alignments to occur in game play only rarely, arbitration would be expected only rarely. Accordingly, q would be raised only slightly if at all. For example, if one expects target alignments to occur only 5% of shots, then q=0.9023 is sufficient: 0.95q+0.05q(0.95)=0.90.

Figure 18:
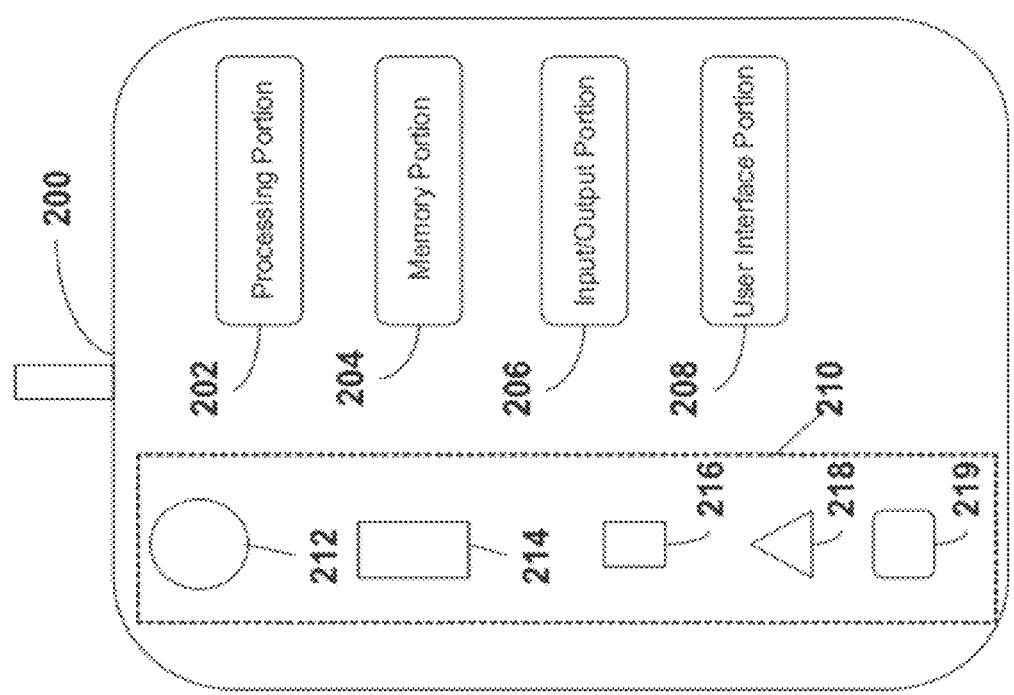
FIG. 18 is a block diagram of an example wireless communications device that is configurable as a PSW.

FIG. 18 is a block diagram of an example wireless communications device, that is configurable as a PSW. The mobile device 200 can include any appropriate device, mechanism, software, and/or hardware for implementation as a PSW as described herein. As described herein, the mobile device 200 comprises hardware, or a combination of hardware and software. And, each portion of the mobile device 200 comprises hardware, or a combination of hardware and software. In an example configuration, the mobile device 200 can comprise a processing portion 202, a memory portion 204, an input/output portion 206, a user interface (UI) portion 208, and a sensor portion 210 comprising at least one of a video camera portion 212, a force/wave sensor 214, a microphone 216, a moisture sensor 218, a compass, 219, or a combination thereof. The force/wave sensor 214 can comprise at least one of a motion detector, an accelerometer, an acoustic sensor, a tilt sensor, a pressure sensor, a temperature sensor, or the like. The motion detector can be configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 218 is capable of detecting moisture, such as detecting if the mobile device 200 is submerged in a liquid. The processing portion 202, memory portion 204, input/output portion 206, user interface (UI) portion 208, video camera portion 212, force/wave sensor 214, and microphone 216 are coupled together to allow communications therebetween (coupling not shown in FIG. 18). The mobile device 200 also can comprise a timer (not depicted in FIG. 18).

In various embodiments, the input/output portion 206 comprises a receiver of the mobile device 200, a transmitter of the mobile device 200, or a combination thereof. The input/output portion 206 is capable of, in conjunction with any other portion of the mobile device 200 as needed, receiving and/or providing information pertaining to functioning as a PSW as described herein. The input/output portion 206 also is capable of communications with other devices/sensors, as described herein. For example, the input/output portion 206 can include a wireless communications (e.g., 2.5G/3G/4G) SIM card. The input/output portion 206 is capable of receiving and/or sending text information, video information, audio information, control information, image information, data, or any combination thereof. In an example embodiment, the input/output portion 206 is capable of receiving and/or sending information to determine a location of the mobile device 200. In an example configuration, the input\output portion 206 comprises a GPS receiver. In an example configuration, the mobile device 200 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 206 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 202 is capable of facilitating implementation of the mobile device 200 as a PSW, as described herein. The processing portion 202, in conjunction with any other portion of the mobile device 200, can provide the ability for users/subscribers to enable, disable, and configure various features of an application for use as a PSW, as described herein. The processing portion 202, in conjunction with any other portion of the mobile device 200 as needed, can enable the mobile device 200 to covert speech to text when it is configured to send text messages. In an example embodiment, the processing portion 202, in conjunction with any other portion of the mobile device 200 as needed, can convert text to speech for rendering via the user interface portion 208.

In a basic configuration, the mobile device 200 can include at least one memory portion 204. The memory portion 204 can store any information utilized in conjunction with implementation of the mobile device 200 as a PSW, as described herein. Depending upon the exact configuration and type of processor, the memory portion 204 can be volatile (such as some types of RAM), non-volatile (such as ROM, flash memory, etc.). The mobile device 200 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 204, or a portion of the memory portion 202 is hardened such that information stored therein can be recovered if the mobile device 200 is exposed to extreme heat, extreme vibration, extreme moisture, corrosive chemicals or gas, or the like. In an example configuration, the information stored in the hardened portion of the memory portion 204 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 204 intelligible.

The mobile device 200 also can contain a UI portion 208 allowing a user to communicate with the mobile device 200. The UI portion 208 is capable of rendering any information utilized in conjunction with implementation of the mobile device 200 as a PSW, as described herein. For example, the UI portion 208 can provide means for entering text, entering a phone number, rendering text, rendering images, rendering multimedia, rendering sound, rendering video, receiving sound, rendering mechanical vibration, or the like, as described herein. The UI portion 208 can provide the ability to control the mobile device 200, via, for example, buttons, soft keys, voice actuated controls, a touch screen, movement of the mobile device 200, visual cues (e.g., moving a hand or finger in front of a camera on the mobile device 200), or the like. The UI portion 208 can provide visual information (e.g., via a display), audio information (e.g., via speaker), mechanically (e.g., via a vibrating mechanism), or a combination thereof. In various configurations, the UI portion 208 can comprise a display, a touch screen, a keyboard, a speaker, or any combination thereof. The UI portion 208 can comprise means for inputting biometric information, such as, for example, fingerprint information, retinal information, voice information, and/or facial characteristic information. The UI portion 208 can be utilized to enter an indication of the designated destination (e.g., the phone number, IP address, geographic information, or the like).

In an example embodiment, the sensor portion 210 of the mobile device 200 comprises the video camera portion 212, the force/wave sensor 214, and the microphone 216. The video camera portion 212 comprises a camera (or cameras) and associated equipment capable of capturing still images and/or video and to provide the captured still images and/or video to other portions of the mobile device 200. In an example embodiment, the force/wave sensor 214 comprises an accelerometer, a tilt sensor, an acoustic sensor capable of sensing acoustic energy, an optical sensor (e.g., infrared), or any combination thereof.

Although not necessary to implement the mobile device 200 as a PSW, a communications device can be part of and/or in communications with various wireless communications networks. Some of which are described below.

Figure 19:
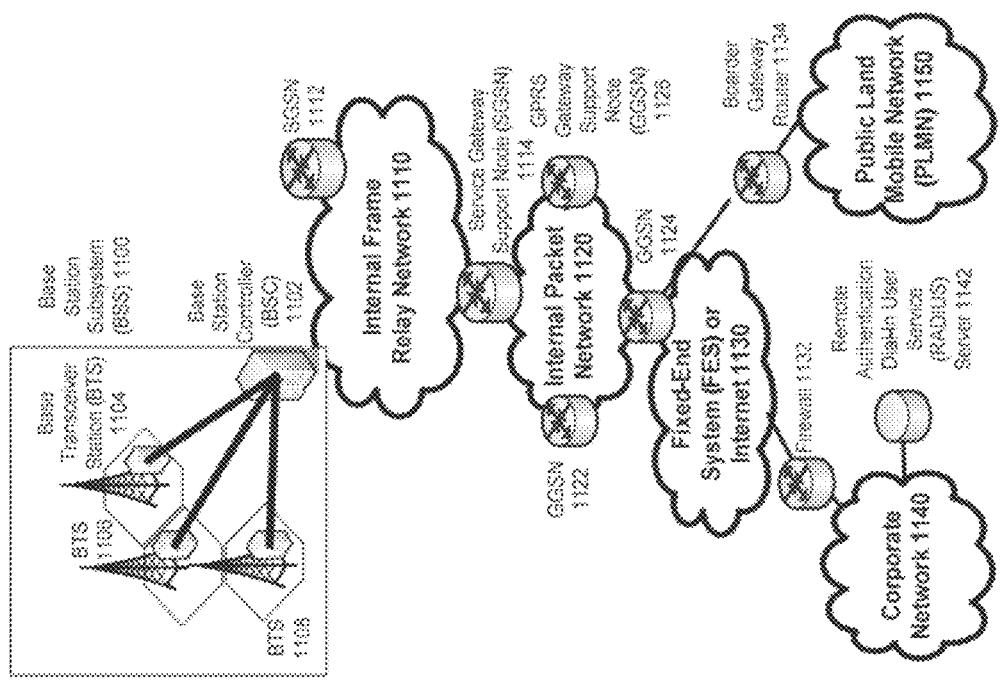
FIG. 19 depicts an overall block diagram of an exemplary packet-based mobile cellular network environment, such as a GPRS network, within which information a mobile device configured as a PSW can be implemented.

FIG. 19 depicts an overall block diagram of an exemplary packet-based mobile cellular network environment, such as a GPRS network, within which information a mobile device configured as a PSW can be implemented. In the exemplary packet-based mobile cellular network environment shown in FIG. 19, there are a plurality of Base Station Subsystems ("BSS") 1100 (only one is shown), each of which comprises a Base Station Controller ("BSC") 1102 serving a plurality of Base Transceiver Stations ("BTS") such as BTSs 1104, 1106, and 1108. BTSs 1104, 1106, 1108, etc. are the access points where users of packet-based mobile devices become connected to the wireless network. In exemplary fashion, the packet traffic originating from user devices is transported via an over-the-air interface to a BTS 1108, and from the BTS 1108 to the BSC 1102. Base station subsystems, such as BSS 1100, are a part of internal frame relay network 1110 that can include Service GPRS Support Nodes ("SGSN") such as SGSN 1112 and 1114. Each SGSN is connected to an internal packet network 1120 through which a SGSN 1112, 1114, etc. can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 mainly provide an interface to external Internet Protocol ("IP") networks such as Public Land Mobile Network ("PLMN") 1150, corporate intranets 1140, or Fixed-End System ("FES") or the public Internet 1130. As illustrated, subscriber corporate network 1140 may be connected to GGSN 1124 via firewall 1132; and PLMN 1150 is connected to GGSN 1124 via boarder gateway router 1134. The Remote Authentication Dial-In User Service ("RADIUS") server 1142 may be used for caller authentication when a user of a mobile cellular device calls corporate network 1140.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 20:
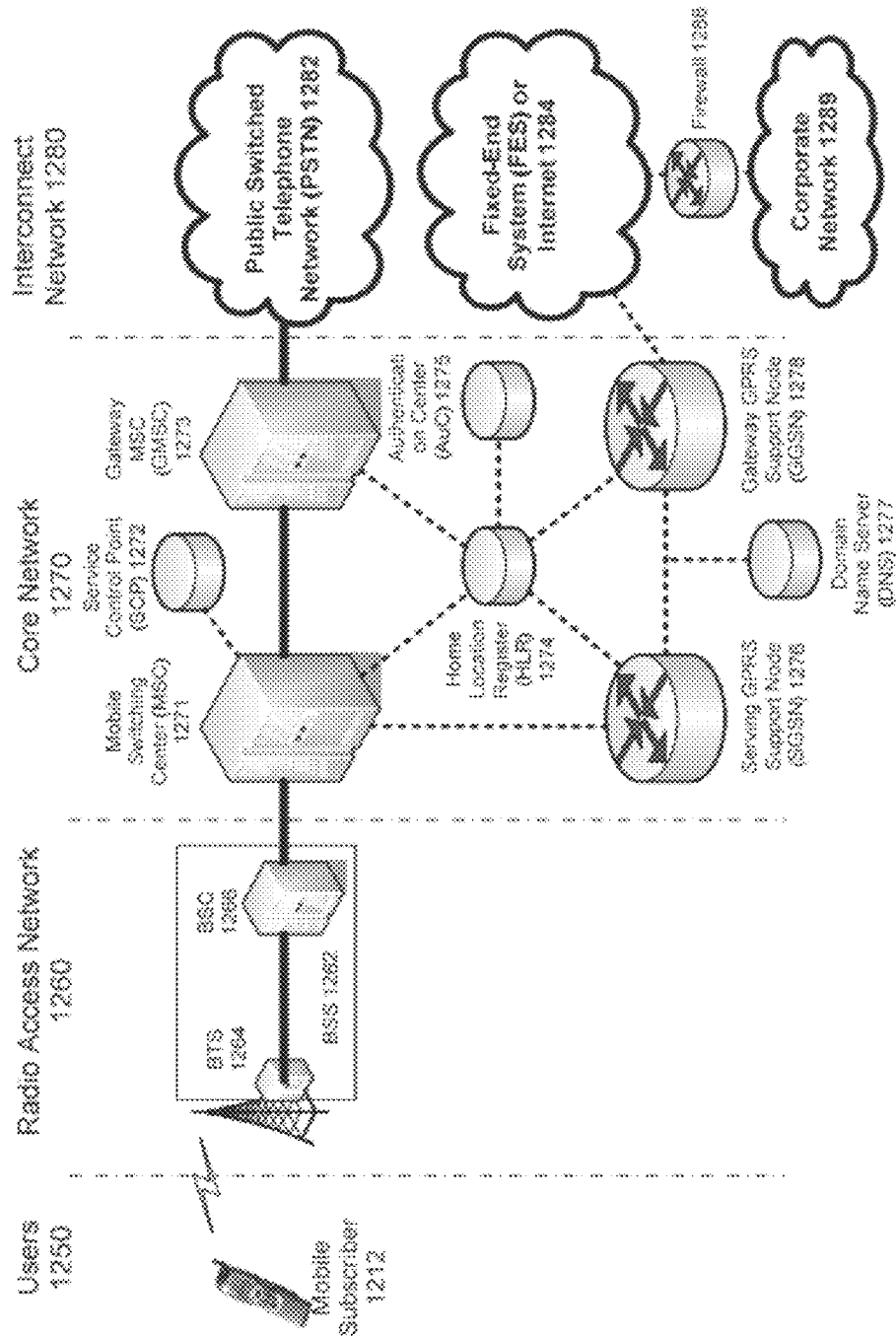
FIG. 20 illustrates an architecture of a typical GPRS network within which a mobile device configured as a PSW can be implemented.

FIG. 20 illustrates an architecture of a typical GPRS network within which a mobile device configured as a PSW can be implemented. The architecture depicted in FIG. 20 is segmented into four groups: users 1250, radio access network 1260, core network 1270, and interconnect network 1280. Users 1250 comprise a plurality of end users. Note, device 1212 is referred to as a mobile subscriber in the description of network shown in FIG. 20. In an example embodiment, the device depicted as mobile subscriber 1212 comprises a communications device (e.g., device/sensor 70). Radio access network 1260 comprises a plurality of base station subsystems such as BSSs 1262, which include BTSs 1264 and BSCs 1266. Core network 1270 comprises a host of various network elements. As illustrated in FIG. 20, core network 1270 may comprise Mobile Switching Center ("MSC") 1271, Service Control Point ("SCP") 1272, gateway MSC 1273, SGSN 1276, Home Location Register ("HLR") 1274, Authentication Center ("AuC") 1275, Domain Name Server ("DNS") 1277, and GGSN 1278. Interconnect network 1280 also comprises a host of various networks and other network elements. As illustrated in FIG. 20, interconnect network 1280 comprises Public Switched Telephone Network ("PSTN") 1282, Fixed-End System ("FES") or Internet 1284, firewall 1288, and Corporate Network 1289.

A mobile switching center can be connected to a large number of base station controllers. At MSC 1271, for instance, depending on the type of traffic, the traffic may be separated in that voice may be sent to Public Switched Telephone Network ("PSTN") 1282 through Gateway MSC ("GMSC") 1273, and/or data may be sent to SGSN 1276, which then sends the data traffic to GGSN 1278 for further forwarding.

When MSC 1271 receives call traffic, for example, from BSC 1266, it sends a query to a database hosted by SCP 1272. The SCP 1272 processes the request and issues a response to MSC 1271 so that it may continue call processing as appropriate.

The HLR 1274 is a centralized database for users to register to the GPRS network. HLR 1274 stores static information about the subscribers such as the International Mobile Subscriber Identity ("IMSI"), subscribed services, and a key for authenticating the subscriber. HLR 1274 also stores dynamic subscriber information such as the current location of the mobile subscriber. Associated with HLR 1274 is AuC 1275. AuC 1275 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 20, when mobile subscriber 1212 initiates the attach process by turning on the network capabilities of the mobile device, an attach request is sent by mobile subscriber 1212 to SGSN 1276. The SGSN 1276 queries another SGSN, to which mobile subscriber 1212 was attached before, for the identity of mobile subscriber 1212. Upon receiving the identity of mobile subscriber 1212 from the other SGSN, SGSN 1276 requests more information from mobile subscriber 1212. This information is used to authenticate mobile subscriber 1212 to SGSN 1276 by HLR 1274. Once verified, SGSN 1276 sends a location update to HLR 1274 indicating the change of location to a new SGSN, in this case SGSN 1276. HLR 1274 notifies the old SGSN, to which mobile subscriber 1212 was attached before, to cancel the location process for mobile subscriber 1212. HLR 1274 then notifies SGSN 1276 that the location update has been performed. At this time, SGSN 1276 sends an Attach Accept message to mobile subscriber 1212, which in turn sends an Attach Complete message to SGSN 1276.

After attaching itself with the network, mobile subscriber 1212 then goes through the authentication process. In the authentication process, SGSN 1276 sends the authentication information to HLR 1274, which sends information back to SGSN 1276 based on the user profile that was part of the user's initial setup. The SGSN 1276 then sends a request for authentication and ciphering to mobile subscriber 1212. The mobile subscriber 1212 uses an algorithm to send the user identification (ID) and password to SGSN 1276. The SGSN 1276 uses the same algorithm and compares the result. If a match occurs, SGSN 1276 authenticates mobile subscriber 1212.

Next, the mobile subscriber 1212 establishes a user session with the destination network, corporate network 1289, by going through a Packet Data Protocol ("PDP") activation process. Briefly, in the process, mobile subscriber 1212 requests access to the Access Point Name ("APN"), for example, UPS.com, and SGSN 1276 receives the activation request from mobile subscriber 1212. SGSN 1276 then initiates a Domain Name Service ("DNS") query to learn which GGSN node has access to the UPS.com APN. The DNS query is sent to the DNS server within the core network 1270, such as DNS 1277, which is provisioned to map to one or more GGSN nodes in the core network 1270. Based on the APN, the mapped GGSN 1278 can access the requested corporate network 1289. The SGSN 1276 then sends to GGSN 1278 a Create Packet Data Protocol ("PDP") Context Request message that contains necessary information. The GGSN 1278 sends a Create PDP Context Response message to SGSN 1276, which then sends an Activate PDP Context Accept message to mobile subscriber 1212.

Once activated, data packets of the call made by mobile subscriber 1212 can then go through radio access network 1260, core network 1270, and interconnect network 1280, in a particular fixed-end system or Internet 1284 and firewall 1288, to reach corporate network 1289.

Figure 21:
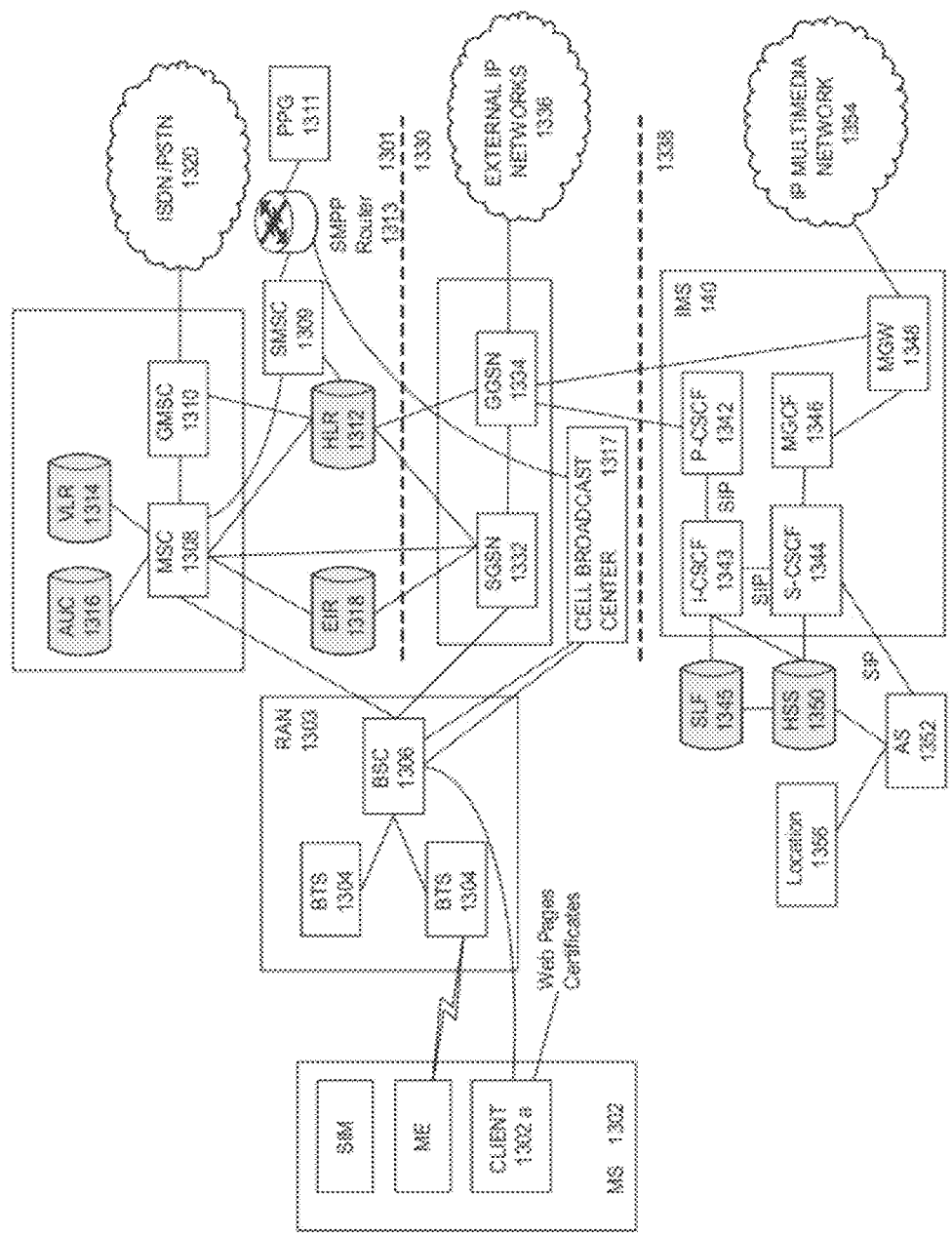
FIG. 21 illustrates an exemplary block diagram view of a GSM/GPRS/IP multimedia network architecture within which a mobile device configured as a PSW can be implemented.

FIG. 21 illustrates an exemplary block diagram view of a GSM/GPRS/IP multimedia network architecture within which a mobile device configured as a PSW can be implemented. As illustrated, the architecture of FIG. 21 includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1304 is physical equipment, such as a radio tower, that enables a radio interface to communicate with the MS. Each BTS may serve more than one MS. The BSC 1306 manages radio resources, including the BTS. The BSC may be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1318, and an Equipment Identity Register (EIR) 1316. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. Thus, the GMSC 1310 provides interworking functionality with external networks.

The HLR 1312 is a database that contains administrative information regarding each subscriber registered in a corresponding GSM network. The HLR 1312 also contains the current location of each MS. The VLR 1314 is a database that contains selected administrative information from the HLR 1312. The VLR contains information necessary for call control and provision of subscribed services for each MS currently located in a geographical area controlled by the VLR.

The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (i.e., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations and security functions and access controls.

A Cell Broadcast Center (CBC) 1317 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS through the SGSN. When packet-switched data leaves the GPRS network, it is transferred to an external TCP-IP network 1336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1338 was introduced with 3GPP Release 5, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 may be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 may also modify an outgoing request according to a set of rules defined by the network operator (for example, address analysis and potential modification).

The I-CSCF 1343, forms an entrance to a home network and hides the inner topology of the home network from other networks and provides flexibility for selecting an S-CSCF. The I-CSCF 1343 may contact a subscriber location function (SLF) 1345 to determine which HSS 1350 to use for the particular subscriber, if multiple HSS's 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with other IP multimedia networks 1354.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 22:
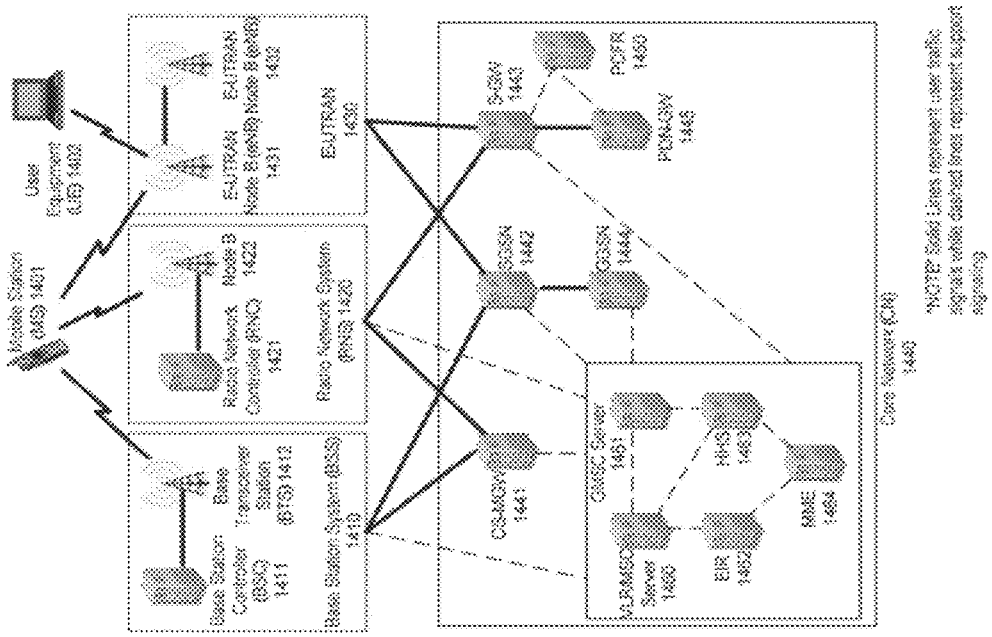
FIG. 22 illustrates a PLMN block diagram view of an exemplary architecture in which a mobile device configured as a PSW may be incorporated.

FIG. 22 illustrates a PLMN block diagram view of an exemplary architecture in which a mobile device configured as a PSW may be incorporated. Mobile Station (MS) 1401 is the physical equipment used by the PLMN subscriber. In one illustrative embodiment, WT 200 and/or communications device 120 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 22 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Exemplary data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of a mobile device configured as a PSW have been described in connection with various computing devices/processors, the underlying concepts can be applied to any computing device, processor, or system capable of implementing a mobile device configured as a PSW. The various techniques described herein can be implemented in connection with hardware or software or, where appropriate, with a combination of both. Thus, the methods and apparatuses for implementing a mobile device configured as a PSW, or certain aspects or portions thereof, can utilize program code (i.e., instructions) embodied in tangible storage media having a tangible physical structure. Examples of tangible storage media include floppy diskettes, CD-ROMs, DVDs, hard drives, or any other tangible machine-readable storage medium (tangible computer-readable storage medium). Thus, a tangible storage medium as described herein is not a transient propagating signal. When the program code is loaded into and executed by a machine, such as a computer, the machine becomes an apparatus for implementing a mobile device configured as a PSW. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for implementing a mobile device configured as a PSW also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing a mobile device configured as a PSW. When implemented on a general-purpose processor, the program code combines with the processor to provide a unique apparatus that operates to invoke the functionality of a mobile device configured as a PSW.

While a mobile device configured as a PSW has been described in connection with the various embodiments of the various figures, it is to be understood that other similar embodiments can be used or modifications and additions can be made to the described embodiments for a mobile device configured as a PSW without deviating therefrom. For example, one skilled in the art will recognize that a mobile device configured as a PSW as described in the present application may apply to any environment, whether wired or wireless, and may be applied to any number of such devices connected via a communications network and interacting across the network. A mobile device configured as a PSW should not be limited to any single embodiment, but rather should be construed in breadth and scope in accordance with the appended claims.

What is claimed:

1. A device comprising:
a processor; and
memory coupled to the processor, the memory comprising executable instructions that when executed by the processor cause the processor to effectuate operations comprising:
receiving an indication of the device firing a virtual element;
determining a location of the device at a time of firing the virtual element;
determining, based on information received from a sensor, an aim angle at which the device was positioned at the time of firing the virtual element;
determining a target effect area relative to the determined location and determined aim angle;

generating a geocast shot message based on the target effect area for the virtual element, wherein the geocast shot message comprises:
an indication of the determined location; and
an indication of the determined aim angle; and
providing the geocast shot message, via a geocast protocol, to each member of a set of devices occupying a geocast region, the geocast region comprising the target effect area.

2. The device of claim 1, wherein the virtual element is at least one of a beam, a projectile, or a grenade.

3. The device of claim 1, further operations comprising:
receiving an arbitration message from a targeted device, the arbitration message comprising a depth of the targeted device; and
determining whether the targeted device was hit by the virtual element.

4. The device of claim 1, wherein the sensor comprises one more of the following: a GPS-based position sensor, an accelerometer, a motion detector, an acoustic sensor, a tilt sensor, a pressure sensor, or a temperature sensor.

5. The device of claim 1, wherein the indication of the device firing the virtual element comprises an audible command.

6. The device of claim 1, wherein the geocast region is large enough to include a location of any other device that may move into the target effect area within a determined amount of time from the time of firing the virtual element.

7. The device of claim 1, the operation further comprising:
receiving a geocast shot message, via the geocast protocol, from another device; the geocast shot message from the other device comprising:
an indication of a shooter position, the shooter position being a determined location of the other device at a trigger pull time of the other device; and
an indication of a shooter aim angle, the shooter aim angle being a determined aim angle of the other device at the trigger pull time of the other device;
determining if the device is within a target effect area associated with the geocast shot message from the other device at a determined point in time;
when the device is determined to be in the target effect area associated with the geocast shot message from the other device at the determined point in time, determining that the device has been hit; and
when the device is determined not to be in the target effect area associated with the geocast shot message from the other device at the determined point in time, determining that the device has been missed.

8. The device of claim 7, wherein the determination as to whether the device is in the target effect area associated with the geocast shot message from the other device at the determined point in time is based on a result of an adjudication function.

9. The device of claim 7, the operations further comprising:
determining a current location of a round associated with the geocast shot message from the other device;
determining a current location of the device;
determining a distance between the current location of the device and determining a distance between the current location of a round and the current location of the device;
determining if the distance between the current location of a round and the current location of the device is less than or equal to a calculated distance;
when the distance between the current location of a round and the current location of the device is less than or equal to the calculated distance, the device is determined to have been hit by the round; and
when the distance between the current location of a round and the current location of the device is greater than the calculated distance, the device is determined to have been missed by the round.

10. A method comprising:
receiving, by a device, an indication of the device firing a virtual element;
determining a location of the device at a time of firing the virtual element;
determining, based on information received from a sensor, an aim angle at which the device was positioned at the time of firing the virtual element; and
determining a target effect area relative to the determined location and determined aim angle;
generating a geocast shot message based on the target effect area for the virtual element, wherein the geocast shot message comprises:
an indication of the determined location; and
an indication of the determined aim angle; and
providing the geocast shot message, via a geocast protocol, to each member of a set of devices occupying a geocast region, the geocast region comprising the target effect area.

11. The method of claim 10, wherein the virtual element is at least one of a beam, a projectile, or a grenade type.

12. The method of claim 10, wherein the indication of the device firing the virtual element comprises at least one of tapping the device, a gesture, or an audible command.

13. The method of claim 10, wherein the geocast region is large enough to include a location of any other device that may move into the target effect area within a determined amount of time from the time of firing the virtual element.

14. The method of claim 10 further comprising:
receiving a geocast shot message, via the geocast protocol, from another device; the geocast shot message from the other device comprising:
an indication of a shooter position, the shooter position being a determined location of the other device at a time of firing the virtual element of the other device; and
an indication of a shooter aim angle, the shooter aim angle being a determined aim angle of the other device at the time of firing the virtual element of the other device;
determining if the device is within a target effect area associated with the geocast shot message from the other device at a determined point in time;
when the device is determined to be in the target effect area associated with the geocast shot message from the other device at the determined point in time, determining that the device has been hit; and
when the device is determined not to be in the target effect area associated with the geocast shot message from the other device at the determined point in time, determining that the device has been missed.

15. The method of claim 14, wherein the determination as to whether the device is in the target effect area associated with the geocast shot message from the other device at the determined point in time is based on a result of an adjudication function.

16. The method of claim 14, further comprising:
determining a current location of a round associated with the geocast shot message from the other device;
determining a current location of the device;

determining a distance between the current location of the device and determining a distance between the current location of a round and the current location of the device;

determining if the distance between the current location of a round and the current location of the device is less than or equal to a calculated distance;

when the distance between the current location of a round and the current location of the device is less than or equal to the calculated distance, determining that the device has been hit by the round; and when the distance between the current location of a round and the current location of the device is greater than the calculated distance, determining that the device has been missed by the round.

17. A computer-readable storage medium having stored thereon computer-executable instructions, that when executed by a processor cause the processor to perform steps of:

receiving, by a device, an indication of the device firing a virtual element;

determining a location of the device at a time of firing the virtual element;

determining, based on information received from a sensor, an aim angle at which the device was positioned at the time of firing the virtual element; and determining a target effect area relative to the determined location and determined aim angle;

generating a geocast shot message based on the target effect area for the virtual element, wherein the geocast shot message comprises:

an indication of the determined location; and an indication of the determined aim angle; and providing the geocast shot message, via a geocast protocol, to each member of a set of devices occupying a geocast region, the geocast region comprising the target effect area.

18. The computer-readable storage medium of claim 17, wherein the indication of the device firing the virtual element is accomplishable without visually observing a display of the device.

19. The computer-readable storage medium of claim 17, wherein the indication of the device firing the virtual element comprises at least one of tapping the device, a gesture, or an audible command.

20. The computer-readable storage medium of claim 17, the executable instructions further for causing the processor to perform steps of:

receiving a geocast shot message, via the geocast protocol, from another device; the geocast shot message from the other device comprising:

an indication of a shooter position, the shooter position being a determined location of the other device at a time of firing the virtual element of the other device; and an indication of a shooter aim angle, the shooter aim angle being a determined aim angle of the other device at the time of firing the virtual element of the other device;

determining if the device is within a target effect area associated with the geocast shot message from the other device at a determined point in time;

when the device is determined to be in the target effect area associated with the geocast shot message from the other device at the determined point in time, determining that the device has been hit; and when the device is determined not to be in the target effect area associated with the geocast shot message from the other device at the determined point in time, determining that the device has been missed.

* * * * *